United States Patent

Hosogi et al.

[11] Patent Number: 6,000,827
[45] Date of Patent: *Dec. 14, 1999

[54] SYSTEM IDENTIFYING DEVICE AND ADAPTIVE LEARNING CONTROL DEVICE

[75] Inventors: Shinya Hosogi; Yoshiharu Maeda, both of Kawasaki, Japan

[73] Assignee: Fujitsu Limited, Kawasaki, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/783,011

[22] Filed: Jan. 14, 1997

Related U.S. Application Data

[63] Continuation of application No. 08/301,778, Sep. 7, 1994, abandoned.

[30] Foreign Application Priority Data

Sep. 10, 1993 [JP] Japan .................................. 5-226182
Aug. 15, 1994 [JP] Japan .................................. 6-191374

[51] Int. Cl.$^6$ ............................................ G05B 13/02
[52] U.S. Cl. ...................... 364/148.03; 364/164; 364/165
[58] Field of Search .................... 364/148–152, 364/160–165, 148.03; 395/21–25, 11, 908, 906, 80, 81, 86, 85, 96; 901/9, 15; 318/568.11, 568.12, 568.13

[56] References Cited

U.S. PATENT DOCUMENTS

| | | | |
|---|---|---|---|
| 5,142,612 | 8/1992 | Skeirik | 395/11 |
| 5,175,678 | 12/1992 | Frerichs et al. | 364/148 |
| 5,212,765 | 5/1993 | Skeirik | 395/11 |
| 5,311,421 | 5/1994 | Nomura et al. | 364/157 |
| 5,353,207 | 10/1994 | Keller et al. | 364/164 |
| 5,371,834 | 12/1994 | Tawel | 395/23 |
| 5,414,619 | 5/1995 | Katayama et al. | 364/151 |
| 5,420,964 | 5/1995 | Sugasaka et al. | 395/23 |
| 5,428,559 | 6/1995 | Kano | 364/151 |
| 5,579,442 | 11/1996 | Kimoto et al. | 395/81 |

FOREIGN PATENT DOCUMENTS 5-197401  8/1993  Japan .

*Primary Examiner*—William Grant
*Assistant Examiner*—Ramesh Patel
*Attorney, Agent, or Firm*—Staas & Halsey, LLP

[57] ABSTRACT

A system identifying device precisely represents as a mathematical model the features of a system such as a robot manipulator, various industrial plants, etc., and can be operated as hardware by identifying an object system over a neural network, thereby successfully identifying a nonlinear system as well as a linear system. Furthermore, an adaptive control device can perform an online learning by using the identifying device to obtain a teaching signal to be used in operating the identifying device in an adaptive control device.

23 Claims, 17 Drawing Sheets

SYSTEM IDENTIFYING DEVICE AND ADAPTIVE LEARNING CONTROL DEVICE

This application is a continuation of application Ser. No. 08/301,778, filed Sep. 7, 1994, now abandoned.

BACKGROUND OF THE INVENTION

1. Field of the Invention

The present invention relates to a system identifying device for precisely representing the features of a system as a mathematical model in a learning control field such as a robot manipulator, various industrial plants, etc.

2. Description of the Related Art

To apply a conventional control method to a control object system and practically controlling it, the features of the system should be precisely represented by a mathematical model. To attain this, an algorithm of identifying a system has been developed for linear and non-linear systems.

Recently, there has been an increase in the number of studies in controlling a robot and recognizing an object using the learning abilities of a neural network. The neural network methods relate to technologies of recognizing an object by repeatedly learning given data even if a system model is indecisive or completely unknown.

However, the control method operating with a neural network normally requires learning data as inputs and outputs in pairs. That is, in response to input data, a neural network starts a learning using known output data as a teaching signal. Accordingly, if a neural network is used as a learning control device in a control field, then the number of applications is currently limited because a teaching signal cannot necessarily be obtained or a teaching signal generating method is unknown at present.

An example of inverse kinematics of a multidegrees-of-freedom manipulator is explained as follows.

Joints 1, 2, 3, . . . , n of a manipulator are positioned from nearest to farthest of a manipulator stand. The joint displacement angle of the i-th joint is set to qi. Thus, the joint displacement vector is represented as follows.

$$\vec{q} = (q_1, q_2, q_3 \ldots q_n)^t$$

where and hereinafter t indicates a transposition vector.

The vector representing a position of the tip of a hand of the manipulator is represented as follows.

$$\vec{x} = (x_1, x_2, x_3 \ldots x_m)^t$$

The relationship between the values are as follows.

$$\vec{x} = f(\vec{q}) \quad (1)$$

If a joint displacement $\vec{q}$ (hereinafter referred to as vector q) is given, then the coordinate x (hereinafter referred to as vector x) of the tip of the hand can be easily obtained. The coordinates of an orbit of the tip of the hand is provided in an instruction during the operation. Therefore, vector q in response to designated vector x can be obtained by processing equation (1) in reverse. That is:

$$\vec{q} = f^{-1}(\vec{x}) \quad (2)$$

The problem of solving equation (2) is called a problem of "inverse kinetics" in which vector q of a joint displacement angle vector is not necessarily associated with vector x of a hand tip position vector. Even if it really is associated with the hand tip position vector x, it is not always a unique value.

Thus, if a hand tip position of a manipulator is given, an associated joint displacement angle can be obtained by solving equation (2). However, this method is effective only for a manipulator of a simple-structure robot. It does not apply to a complex-structure robot manipulator having a large number of joints because the robot requires such a complicated analysis process that the process cannot be practically performed successfully. Thus, since the complex-structure robot manipulator cannot yield a teaching signal group to be used for control, it does not realize an adaptive control device comprising, for example, an adaptive data processing device.

When a target hand-tip position $\vec{x}_d$ (hereinafter referred to as vector $x_d$) is given, a controller should provide for a manipulator a joint angle displacement vector q such that it allows an actual hand-tip position vector x to match vector $x_d$, both of which are different from each other when input. If the controller comprises a neural network, a teaching signal should be provided for the neural network as a correct solution of an inverse kinetics problem.

Thus, described below is an example of a conventional technology of solving an inverse kinetics problem, that is, applying a neural network for the purpose of obtaining an operation parameter and realizing control by identifying the system.

Firstly, an example of applying a neural network to identification of a system operation parameter is an application of a Hopfield network (refer to ISCIE May, 22–24, 1991). However, the example does not work in identifying a non-linear system, and does not relate to an application for control.

Next, an application for control is explained by referring to FIGS. 1 through 6.

In these figures, an adaptive control device is realized by a neural network. A learning device is identified with a straight line diagonally penetrating the box of the adaptive control device, and provides the adaptive control device with a control input error signal so that the adaptive control device can learn data converting capabilities. "N" indicates an adaptive data processing device for realizing earning of the data converting capabilities of the adaptive control device.

FIGS. 1 through 4 show the conventional technology. Refer to D. Psaltis, A. Sideris and A. A. Yamamura: A Multilayered Neural Network, IEEE Control Systems Magazine, Vol.8, No.2, pp.17–21 (1988). In the magazine, an adaptive control device 101 receives target control amount vector $x_d$ and outputs control operation amount vector q to a controlled object 103. An adaptive data processing device N 102 receives control status amount vector x output by the controlled object 103. With this configuration, data converting capabilities of the adaptive control device 101 and the adaptive data processing device N 102 are learned such that output signals of the adaptive control device 101 and the adaptive data processing device N 102, that is, vector q and vector $\vec{q}'$ hereinafter referred to as vector q' respectively, match each other. As a result, the adaptive control device 101 obtains the control operation amount vector q to correctly realize the control specified with control target amount vector $x_d$ and provides it for the controlled object 103.

The conventional technology shown in FIGS. 2A and 2B provides random control operation amount vector q for a controlled object as shown in FIG. 2A, actually operates it, obtains control status amount x of the controlled object, provides it for an adaptive control device 202, and has the adaptive control device 202 learn the data converting capabilities of the adaptive control devices such that a difference $\vec{e}$ (hereinafter referred to as vector e) between an output vector q' of the adaptive control device 202 and control operation amount vector q provided for the controlled object 201 can be minimized. When the controlled object 201 is actually controlled, the adaptive control device 202 having the learned data converting capabilities receives a control target amount vector $x_d$ equal to the control status amount as shown in FIG. 2B. At this time, the control operation amount vector q output by the adaptive control device 202 is provided for the controlled object 201 to perform a controlling operation such that the control status amount of the controlled object 201 equals a target value.

According to the conventional technology shown in FIG. 3, a calculator 303 for calculating an inverse Jacobian of the controlled object is provided when control operation amount vector q output by an adaptive control device 301 which receives control target amount vector $x_d$ is given to a controlled object 302. With the calculator 303, control operation difference $\vec{\Delta q}$ (hereinafter referred to as vector $\Delta q$) which varies with the difference between control target amount vector $x_d$ and control status amount vector x can be calculated. The data converting capabilities of the adaptive control device 301 are learned such that control operation difference vector $\Delta q$ can be minimized. As a result, the adaptive control device 301 obtains control operation amount vector q to correctly realize the control specified by control target amount vector $x_d$ and provides it for the controlled object 302.

The conventional technology shown in FIG. 4 relates to a control method as the combination of the technologies shown in FIGS. 2A, 2B and 3. A calculator 404 for calculating an inverse Jacobian of the controlled object 403 is provided when control operation amount vector q output by a second adaptive control device 402 which receives control target amount vector $x_d$ is given to a controlled object 403. With the calculator 404, control operation difference $\Delta q$ which varies with the difference between control target amount vector $x_d$ and control status amount vector x of a controlled object 403, can be calculated. The data converting capabilities of the second adaptive control device 402 are learned such that control operation difference vector $\Delta q$ can be minimized. The data converting capabilities of the first adaptive control device 401 are learned such that an output vector q' of a first adaptive control device 401 can be equal to control operation amount vector q provided for the controlled object 403. In this case, a subtracter 405 calculates a difference $\Delta q'$ between vector q and vector q' and provides it for the first adaptive control device 401. In this method, since a Jacobian normally represents the relationship between very small amounts, the method shown in FIG. 3 is not necessarily appropriate when there is a large difference between vector $x_d$ and vector x. Therefore, the method shown in FIG. 2A is used to minimize the difference between vector $x_d$ and vector x.

The technology shown in FIG. 5 (refer to A Hierarchical Neural Network Model for Voluntary Movement with Application to Robotics by M. Kawato, Y. Uno, M. Isobe, and R. Suzuki, published by IEEE Control Systems Magazine 8, 8–16 (1988)) describes a feedback control unit 502 which has a fixed gain K and receives a difference between control target amount vector $x_d$ and control status amount vector x of a controlled object 503. The sum of control operation amount vector q output by an adaptive control device 501 which receives control target amount vector $x_d$ and an error amount output by a feedback control unit 502 is provided for the controlled object 503. The data converting capabilities of the adaptive control device 501 are learned such that the error amount output by the feedback control unit 502 can be minimized. Thus, the adaptive control device 501 outputs control operation amount vector q with which the control specified with control target amount vector $x_d$ can be performed more precisely. The feedback control unit 502 generates the above described error amount based on an inverse Jacobian of the controlled object 503.

The conventional technology shown in FIG. 6 (refer to M. Jordan: In ref. 4. (ref. 4/Neural Networks for Control: ed. W. Thomas Miller, III et. al (1990)) describes an adaptive data processing device N 602 which receives control operation amount vector q output by an adaptive control device 601. A learning is made such that the adaptive data processing device N 602 becomes a sequential system having the same input/output characteristics as a controlled object 603. After sufficient learning, an error amount between control status amount x' (hereinafter referred to as vector x') output by the adaptive data processing device N 602 and control target amount vector $x_d$ is back-propagated with an internal status value of the data converting capabilities of the adaptive data processing device N 602 fixed so as to yield an input error. The input error is used as a learning signal in learning the data converting capabilities of the adaptive control device 601. Thus, the adaptive control device 601 outputs control operation amount vector q to realize control target amount vector $x_d$.

However, the conventional technology shown in FIG. 1 requires that the data converting capabilities of the adaptive data processing device N 102 should be preliminarily learned prior to the learning of the data converting capabilities of the adaptive control device 101. Thus, the learning can undesirably result in offline learning. If an output signal of the adaptive control device 101 matches an output signal of the adaptive data processing device N 102 before learning is completed, then the data converting capabilities of the adaptive control device 101 cannot be successfully learned.

The conventional technology shown in FIG. 2B has the problem of offline learning. To change the data converting capabilities of the adaptive control device 202 into those of a right inverse system, a controlled object 201 should be provided with a large number of random control operation amount vectors q before a learning is completed. Furthermore, if any parameter of the controlled object such as the length of a link of a robot arm changes, then learning should be started again.

Since the conventional technology shown in FIGS. 3 and 4 requires that an inverse Jacobian is calculated by the calculators 303 and 404, offline learning may be performed. Furthermore, the knowledge of an inverse Jacobian for the controlled objects 302 and 403 is required to calculate in the calculations 303 and 404.

The conventional technology shown in FIG. 5 has a merit of realizing online learning. However, a fixed gain K of the feedback control unit 502 must be appropriately set to successfully learn the data converting capabilities of the adaptive control device 501. To set the fixed gain K, the knowledge of an inverse Jacobian for the controlled object 503 is required.

According to the conventional technology shown in FIG. 6, the data converting capabilities of the adaptive data processing device N 602 must be preliminarily learned before learning the data converting capabilities of the adaptive control device 601, thereby simply resulting in offline learning.

The problems of the above described conventional technologies are summarized as follows. Those technologies for identifying a system over a neural network have the problem that they cannot identify a non-linear system. Those technologies for obtaining a mathematical model have difficulty in setting an exact model of the system of a controlled object when the system has non-linear redundant degrees of freedom, and have the problem that a solution of inverse dynamics for the mathematical model cannot be uniquely determined.

When a neural network is used in adaptive control of, for example, a robot, a number of conventional technologies use an offline learning method which requires a re-learning of a network when the features of a control object change.

There has been a further problem that a target controlling operation cannot be performed unless a fixed gain is appropriately provided for a feedback control unit 502 in the control method shown in FIG. 5. Especially in a non-linear system it is all the more difficult to set a the fixed gain.

SUMMARY OF THE INVENTION

An object of the present invention is to realize an identifying device capable of identifying an operation parameter of a non-linear system as well as a linear system, and to operate the identifying device as hardware over a neural network.

Another object of the present invention is to design a highly adaptive control device in response to a change in characteristics of a controlled system using output results from the system identifying device.

The present invention provides a system identifying device for representing the features of a system as a mathematical model and controlling it, and more specifically a system identifying device effectively used if the features of an object system are hard to represent as a mathematical model and if the features of the controlled object vary with time.

The present invention provides a system identifying device for outputting a result of an operation parameter identification of a system to be controlled. It generates changing data for data processing capabilities according to the input/output data of the system to be controlled, and outputs using the changing data an identification of the system to be controlled.

DESCRIPTION OF THE PREFERRED EMBODIMENT

The device introduced here comprises a network for identifying linear and non-linear systems and another network for storing the identification result, and can be used to generate a teaching signal for a controlled neural net system.

Figure 7:
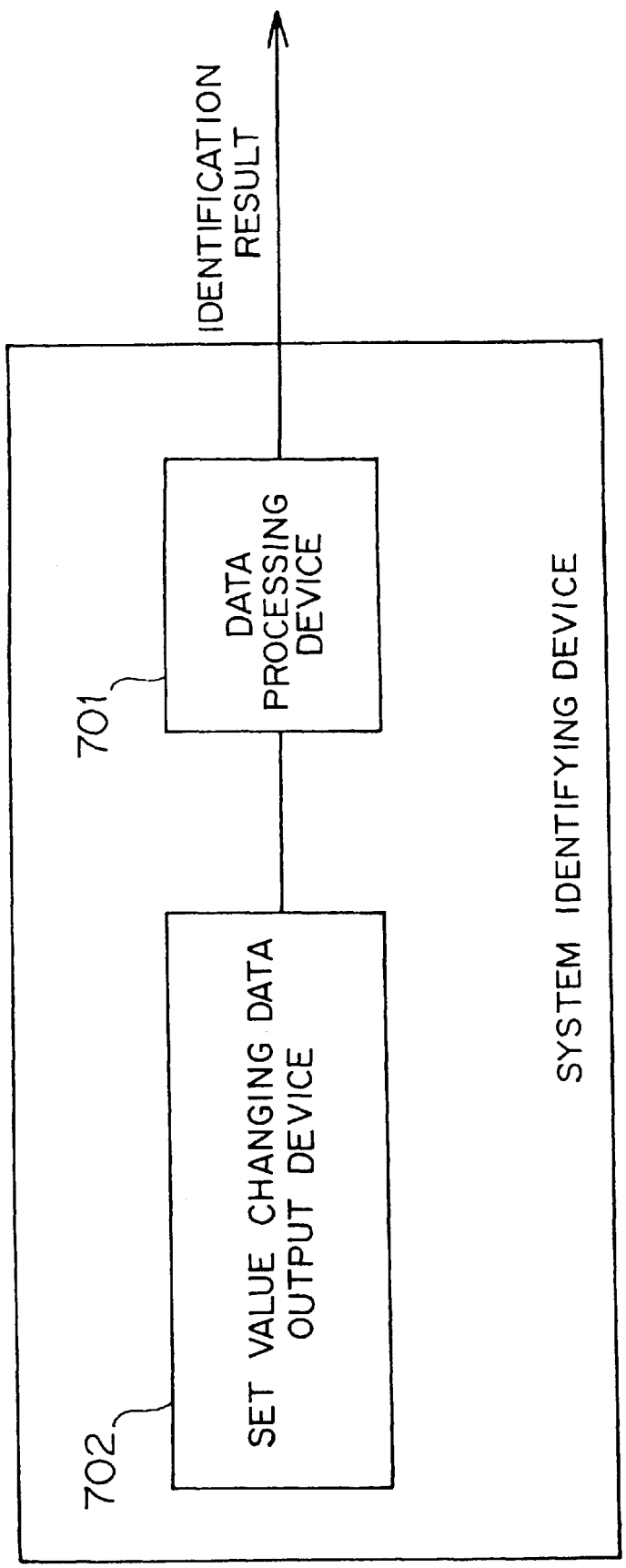
FIG. 7 is the block diagram of the configuration showing the principle of the present invention.

FIG. 7 is the block diagram showing the principle of the present invention. It shows an example of a configuration showing the principle of a device for identifying, for example, a system and comprising a data processing device for outputting an identification result of a controlled object or of a system parameter.

In FIG. 7, a data processing device 701 calculates and outputs an output signal in response to an input signal according to the changeable data processing capabilities. The device can be a Hopfield neural network.

A set value changing data output device 702 outputs to the data processing device 701 set value changing data to change the settings of data processing capabilities with. The unit can be, for example, a correlator.

According to the present invention, the data processing device 701 such as a Hopfield neural network outputs a Jacobian or an inverse Jacobian for a robot manipulator as an identification result of an object system.

A correlator forming part of the set value changing data output device 702 is connected to the Hopfield neural network, The correlator outputs an external input to each neuron forming part of the Hopfield neural network and outputs a coupling coefficient between the neurons based on the correlation between an input and an output of the object system.

A small displacement of a joint angle of a robot manipulator and a responsive small displacement of the hand tip of the robot are entered for the input/output correlation of an object system. An external input and a coupling coefficient are output from the correlator in response to the corresponding values and provided to the Hopfield neural network. A small input value and a corresponding small output value are provided for the correlator, and an external input and a coupling coefficient are output to a network. These operations are repeated until a constant value is output by the network. When the output of the network has become constant, a Jacobian or an inverse Jacobian is output by the Hopfield neural network.

According to the present invention, a hierarchical neural network is provided in parallel with the correlator and the Hopfield neural network. An input signal to an object system is given as an input to the hierarchical neural network. Then, learning of the hierarchical neural network is performed such that an output of the Hopfield neural network matches an output of the hierarchical neural network. Thus realized is a system identifying device capable of corresponding to a change in the features of even a non-linear system.

Figure 1:
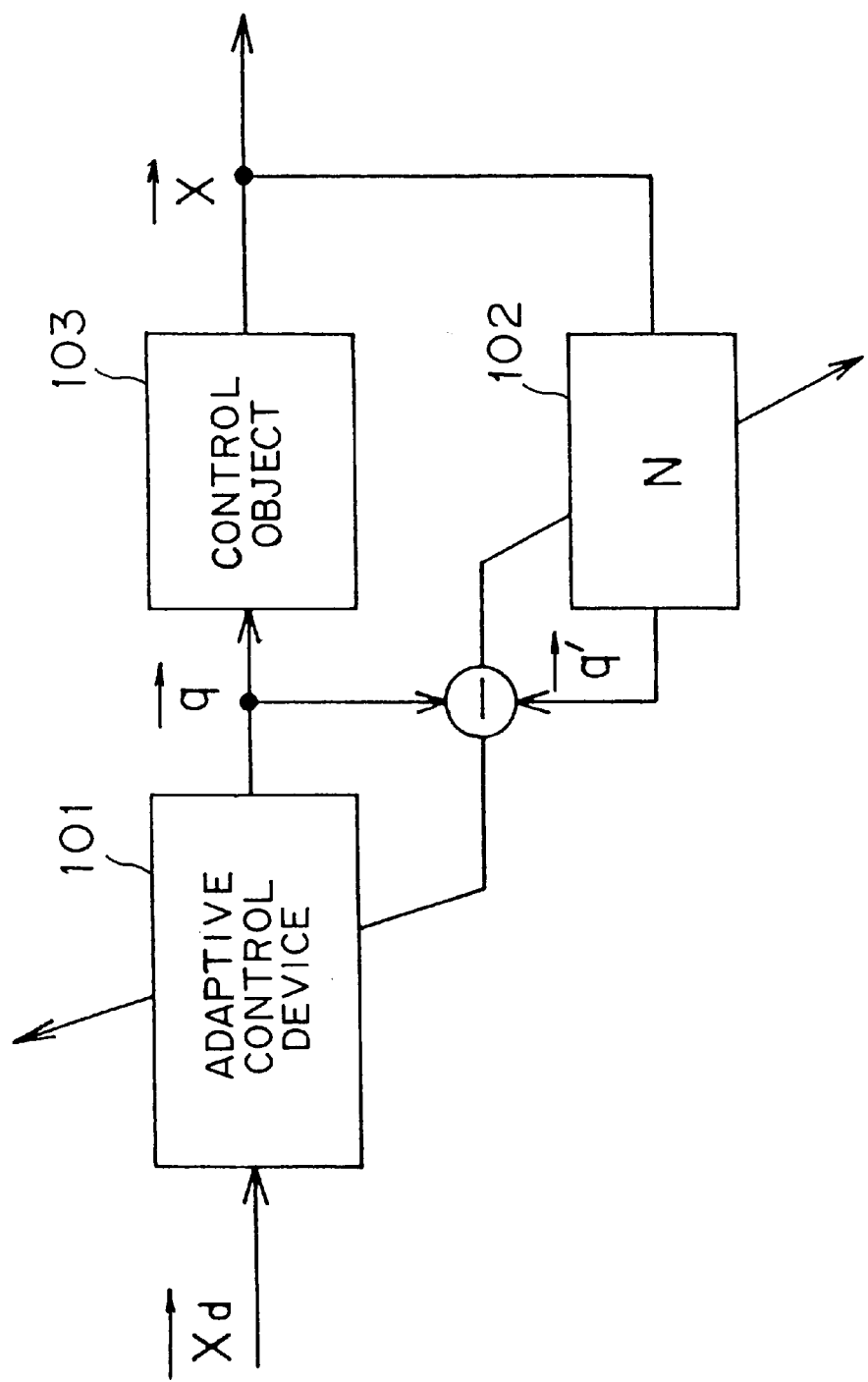
FIG. 1 is the block diagram of the configuration of the control device operated with a neural network according to the conventional technology (1)
Figure 2A:
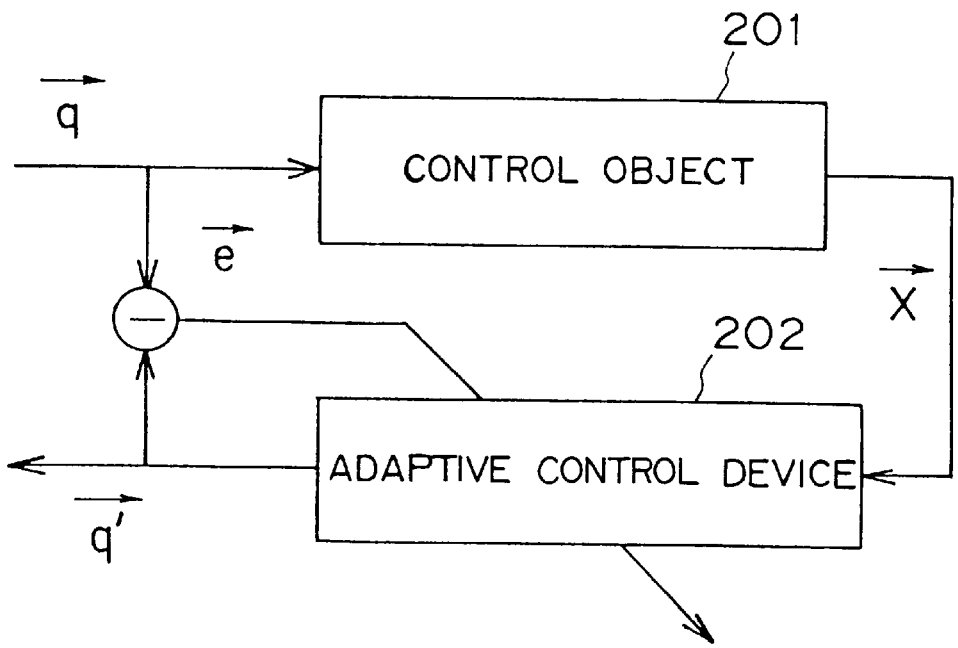
FIGS. 2A and 2B and are the block diagrams of the configuration showing the control device operated over a neural network according to the conventional technology (2)
Figure 2B:
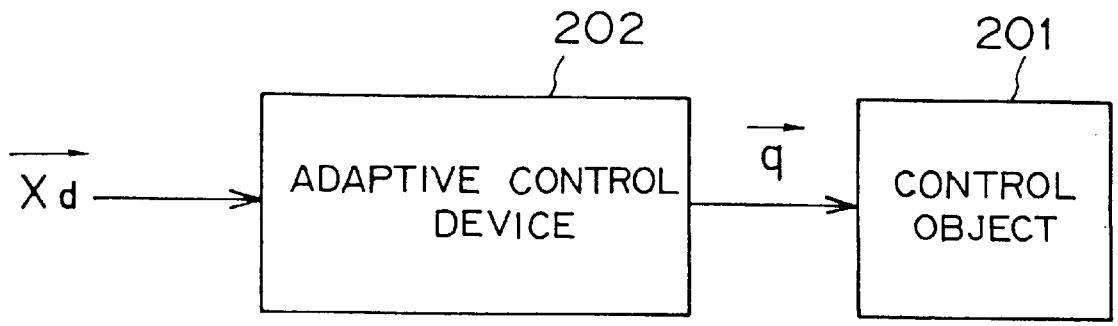
Figure 3:
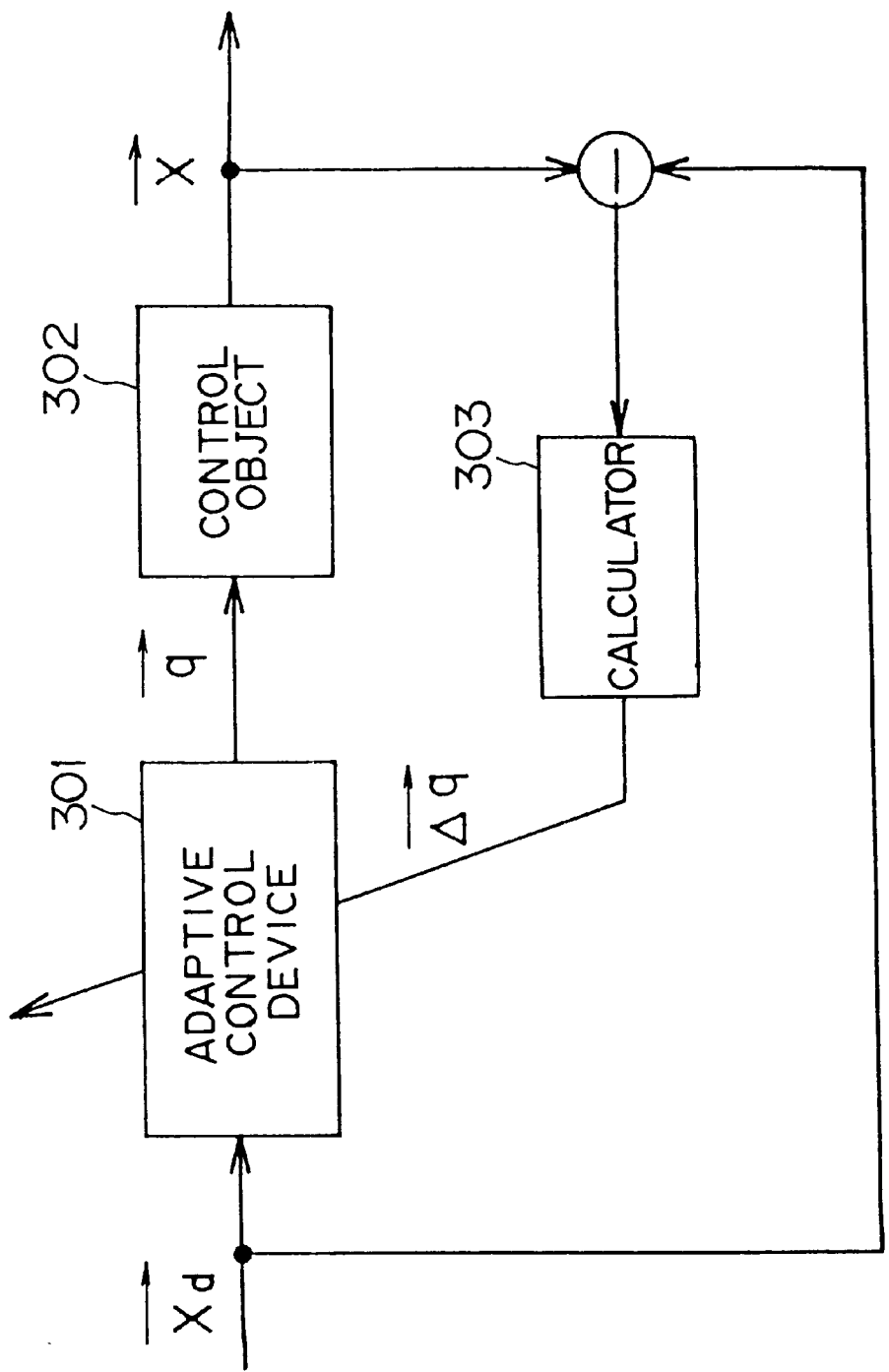
FIG. 3 is the block diagram of the configuration showing the control device operated with a neural network according to the conventional technology (3)
Figure 4:
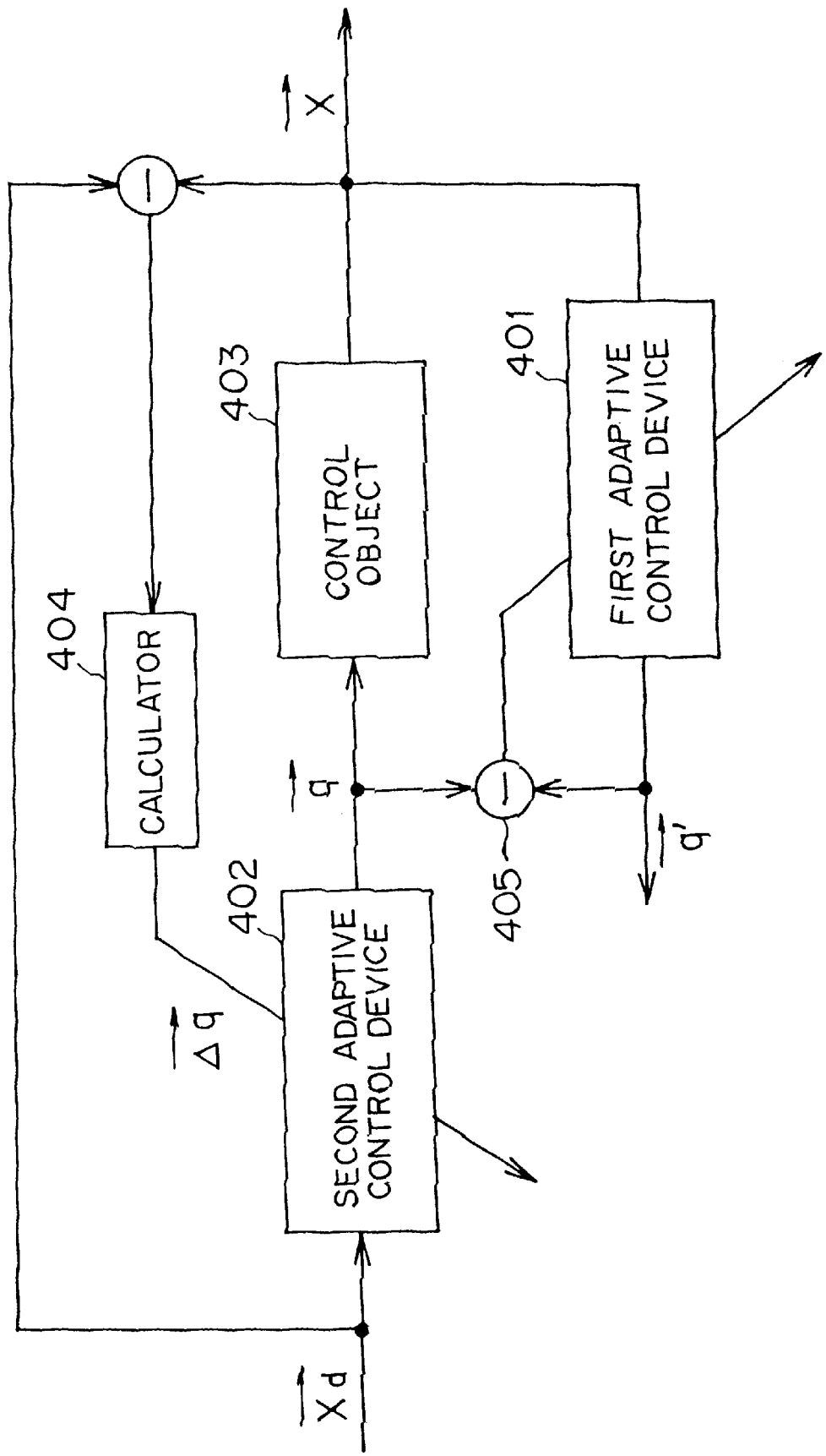
FIG. 4 is the block diagram of the configuration showing the control device operated over a neural network according to the conventional technology (4)
Figure 5:
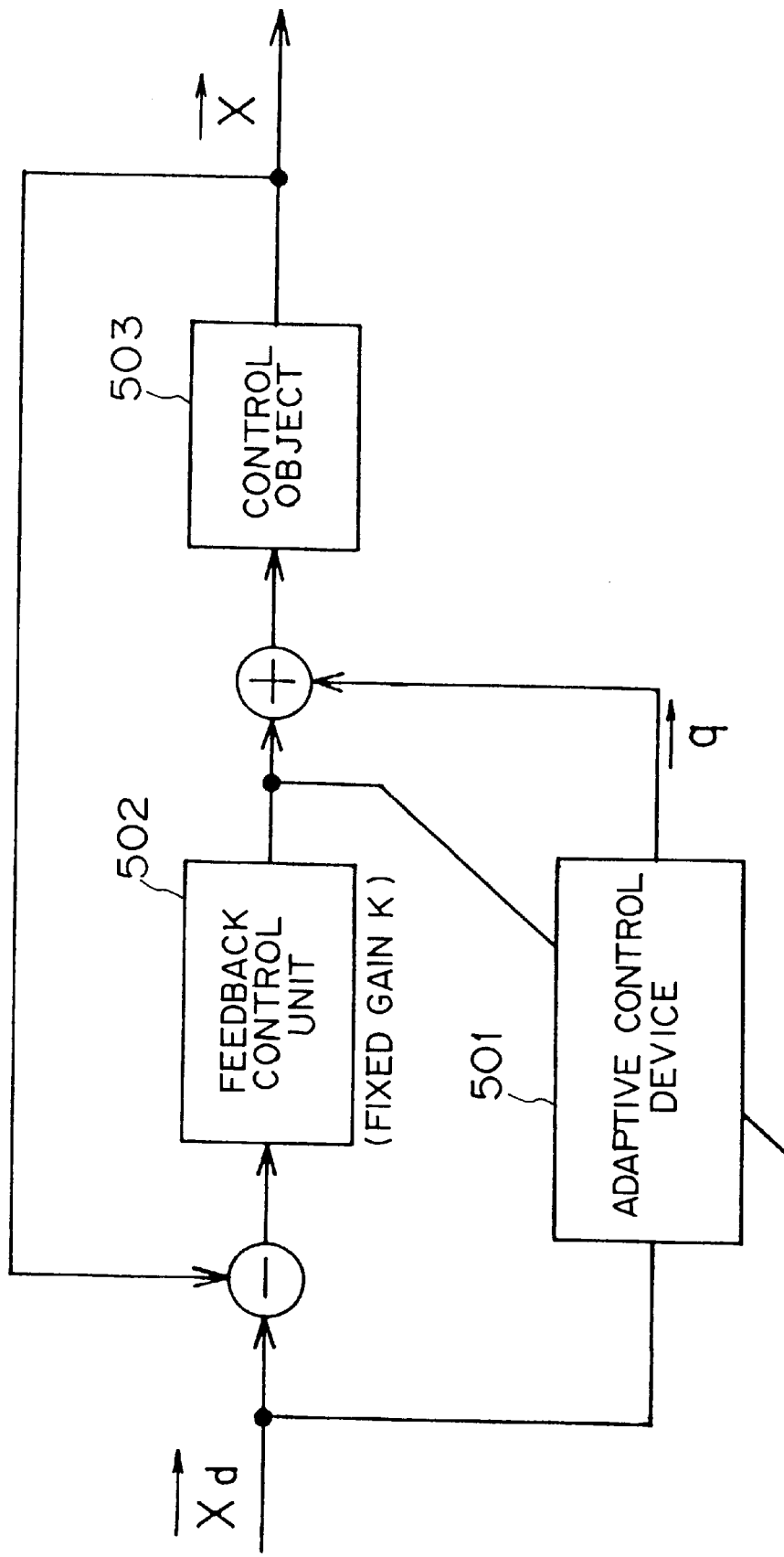
FIG. 5 is the block diagram of the configuration showing the control device operated over a neural network according to the conventional technology (5)
Figure 6:
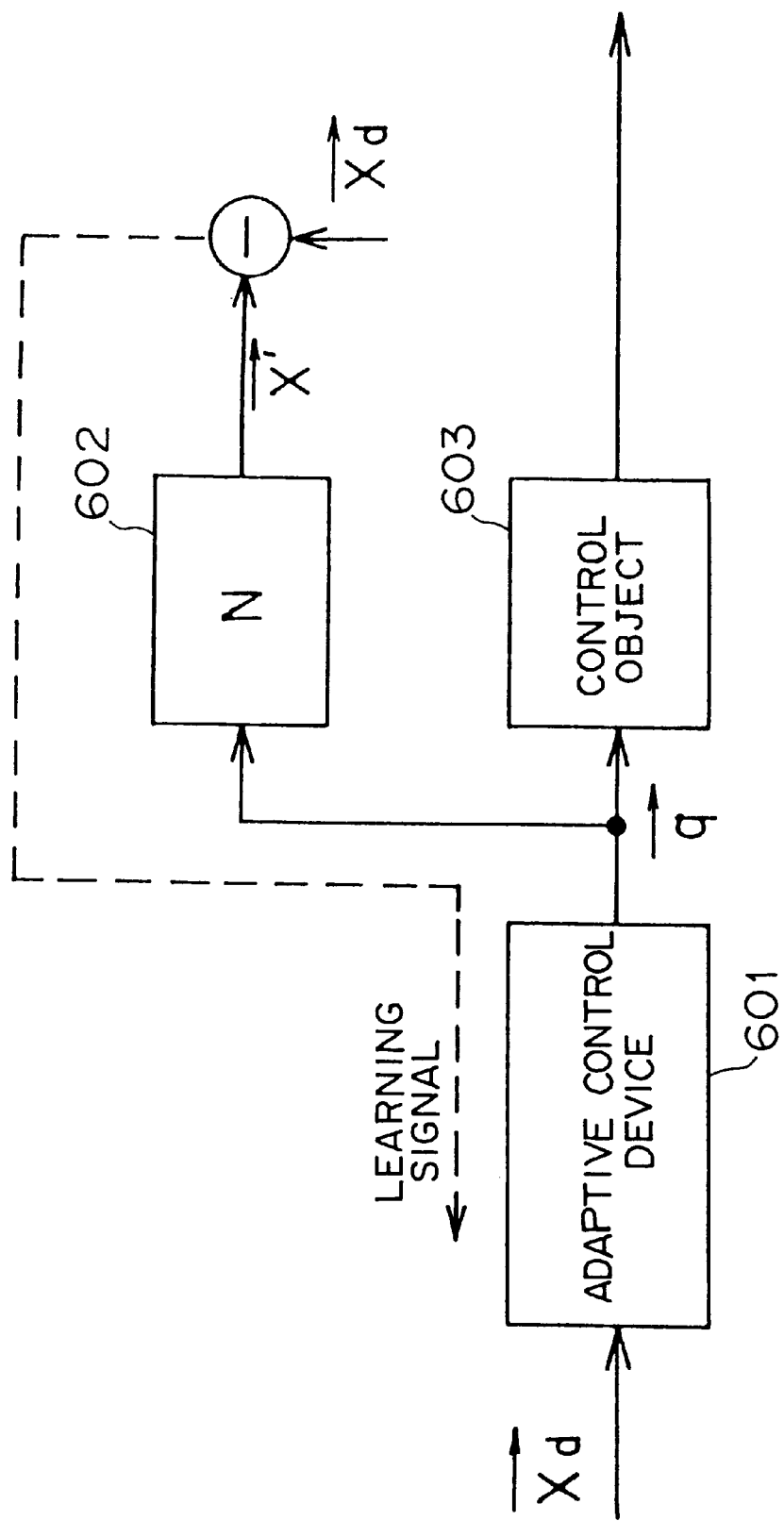
FIG. 6 is the block diagram of the configuration showing the control device operated over a neural network according to the conventional technology (6)

Furthermore, a highly-adaptive control device can be realized if the hierarchical neural network replaces a fixed feedback gain K in the adaptive control device shown in FIG. 5 and a teaching signal is generated for the hierarchical neural network by the system identifying device of the present invention.

An inverse kinetics problem of a robot arm is explained below as an embodiment of the system identifying device of the present invention. In the explanation below, vectors x and q respectively indicate vectors of the tip of a robot hand and the joint angle of the robot, $\Delta \vec{x}$ (hereinafter referred to as vector $\Delta x$) indicates a small displacement of the position of the tip of the robot hand, and vector $\Delta q$ indicates a small displacement of the joint angle. Assume that these small displacements are measurable.

The following equation is established with the relationship set between vector $\Delta x$ and vector $\Delta q$, and a Jacobian set to $\vec{J}$ (hereinafter referred to as vector J).

$$\Delta \vec{x} = \vec{J}(\vec{q}) \Delta \vec{q} \qquad (3)$$

The relationship is non-linear. A specific joint angle $\vec{q}_0$ (hereinafter referred to as vector $q_0$) is given such that a linear system can be processed. Then, a Jacobian is identified for the joint angle vector $q_0$. That is, vector J ($q_0$) is a system parameter to be identified.

Figure 8:
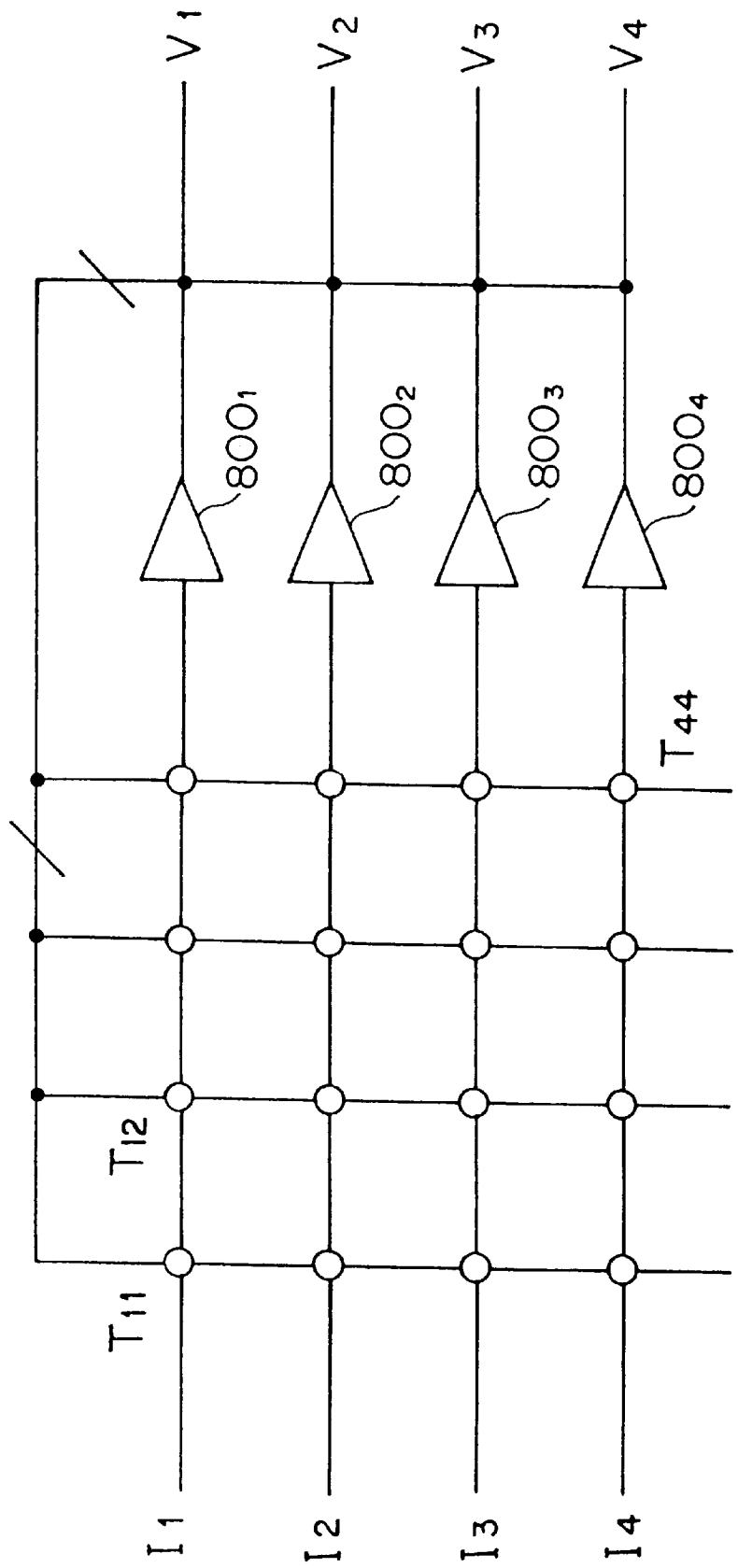
FIG. 8 shows the configuration of the neural network for use in identifying an operation parameter of a system.

The neural network shown in FIG. 8 is a Hopfield network in which operation elements, that is, neurons, are connected to one another. The operation elements are realized as operating units $800_1$–$800_4$ in FIG. 8. The number N of the operating units is 4. An input to each of the operation elements of the network is represented by $I_i$ (i=1, ..., N), an output from each operation element of the network is represented by $V_i$ (i=1, ..., N), and a coupling coefficient between the operation elements is represented by $T_{ij}$ (i, j=1, ..., N).

In FIG. 8, a sum $u_i$ of inputs to the operation elements is calculated by the following equation.

$$+e,sez\ \Sigma + hd\ j + ee\ T_{ij}V_j + I_i \qquad (4)$$

(a sum of all operation elements and external inputs)
Output $V_i$ of the operation elements is $$V_i = g(u_i)(g(u) = \tan h(u/\Delta)) \qquad (5)$$

The dynamics of the network is calculated as follows. First, the energy of the circuit is obtained by:

$$E(V) = -(\tfrac{1}{2}) \Sigma_i \Sigma_j T_{ij} V_i V_j - \Sigma_i I_i V_i \qquad (6)$$

Assuming that $V_k$ changes by $\Delta V_k$, the energy changes as follows.

$$\begin{aligned}
E(V + \Delta V_k) - E(V) &= -(1/2) \sum_i \sum_j T_{ij}(V_i + \Delta V_i \delta_{ki}) \\
&\quad (V_j + \Delta V_j \delta_{kj}) - \sum_i I_i(V_i + \Delta V_i \delta_{ki}) - E(V) \\
&= -(1/2)\left[\sum_i T_{ik} V_i \Delta V_k + \sum_j T_{kj} \Delta V_k V_j\right] - \\
&\quad (1/2) T_{kk}(\Delta V_k)^2 - I_k \Delta V_k \\
&= -(1/2) \sum_i (T_{ik} + T_{ki}) V_i \Delta V_k - \\
&\quad (1/2) T_{kk}(\Delta V_k)^2 - I_k \Delta V_k \\
&= -\left[\sum_i T_{ki} V_i + I_k\right] \Delta V_k - T_{kk}(\Delta V_k)^2
\end{aligned} \qquad (7)$$

(when T is an symmetric matrix ($T_{ik} = T_{ki}$))

where $\delta_{ki}$ is a Kronecker's delta symbol, and its value equals 1 when k=i and 0 when k≠i. Accordingly, if $T_{kk} \geq 0$ (k=1, ..., N), then the second term of equation (7) equals 0 or a negative value regardless of the value of $\Delta V_k$. If the first term is changed as follows, the value constantly equals 0 or a negative value.

$$\Delta V_k \simeq c \Delta u_k \text{(where } c > 0\text{)} \qquad (8)$$

That is, the relationship between the output $V_i$ of each operation element and its internal potential $u_i$ is calculated as follows.

$$V_i = g(u_i)(g(u_i) = \tan h(u_i/\Delta)) \qquad (9)$$

where the update amount $\Delta u_k$ of $u_k$ is obtained as follows depending on the value of $u_k$.

$$\Delta u_k = C[\Sigma_i T_{ki} V_i + I_k] \qquad (10)$$

Thus, $\Delta V_k \simeq \Delta u_k$ indicates that the first term also equals 0 or a negative value, thereby decreasing energies.

The following explanation of the identifying device makes use of such features of the neural network.

Next, an identifying device which outputs a Jacobian is explained below.

Vector $\Delta x$ indicates an actual displacement of the tip of the hand, and $\Delta \vec{x}'$ (hereinafter referred to as vector $\Delta x'$) indicates the displacement calculated with the output $V_k$ of a network 17. That is, $V_k$ corresponds to a Jacobian: $V_k = J_{ij}$ ($q_0$).

The following evaluation function is obtained.

$$\begin{aligned}
E &= (\Delta \vec{x} - \Delta \vec{x}')(\Delta \vec{x} - \Delta \vec{x}')^t \\
&= (\vec{x} - V(q_0)\Delta \vec{q})(\Delta \vec{x} - V(q_0)\Delta \vec{q})^t
\end{aligned} \qquad (11)$$

The above equation can be assigned to the equation of energy in the network 17. For example, the following equation applies to a robot having two arms operating on the two-dimensional plane.

$$T = -2 \begin{bmatrix} \Delta q_1^2 & \Delta q_1 \Delta q_2 & 0 & 0 \\ \Delta q_2 \Delta q_1 & \Delta q_2^2 & 0 & 0 \\ 0 & 0 & \Delta q_1^2 & \Delta q_1 \Delta q_2 \\ 0 & 0 & \Delta q_2 \Delta q_1 & \Delta q_2^2 \end{bmatrix} \quad (12)$$

$$\vec{I} = 2(\Delta x_1 \Delta q_1 \ \Delta x_1 \Delta q_2 \ \Delta x_2 \Delta q_1 \ \Delta x_2 \Delta q_2)^t \quad (13)$$

Figure 9:
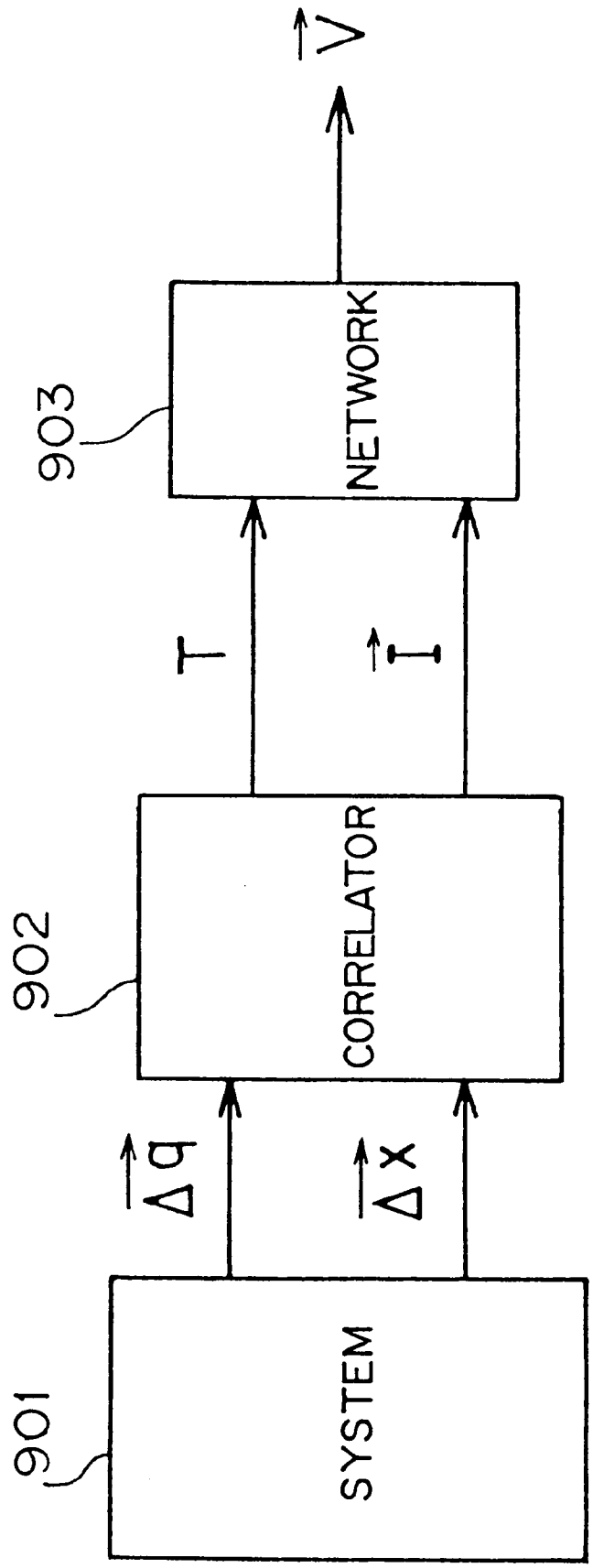
FIG. 9 is the block diagram of the configuration of an embodiment of a system identifying device.

FIG. 9 is the block diagram of the configuration of the device for identifying an operation parameter of the system, that is, a Jacobian in this example. In FIG. 9, the identifying device comprises a correlator 902 for receiving a small displacement vector $\Delta q$ of an input and a small displacement vector $\Delta x$ of an object system 901 and outputting a matrix T of coupling coefficients in a Hopfield network 903 and an external input vector $\vec{I}$ (hereinafter referred to as vector I) for each neuron in the network 903; and the Hopfield network 903 for outputting, in response to an input from the correlator 902, a Jacobian as an output V from an internal neuron.

Figure 10:
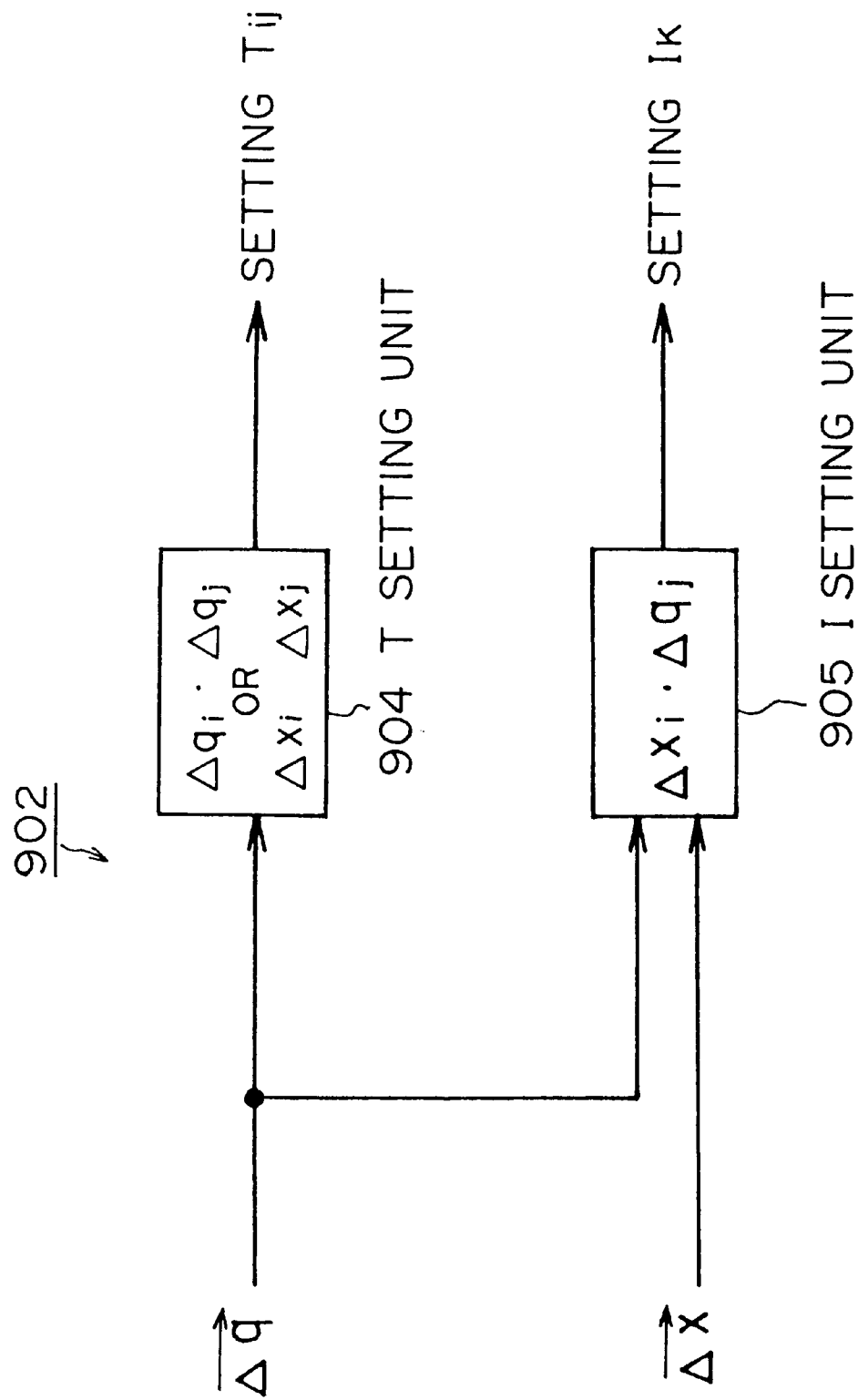
FIG. 10 is the block diagram of the detailed configuration of the correlator.

FIG. 10 is the block diagram of the detailed configuration of the correlator 902. The correlator 902 comprises a T setting unit 904 for outputting a coefficient matrix T and an I setting unit 905 for outputting a vector external input matrix I.

The operation of the identifying device is performed in the following steps.

1. A small input is applied to the system, and a responsive output displacement is observed. A noise can be regarded as the small input.

2. Using the observation result, the correlator obtains a coefficient matrix T and an input vector I in the network 903, and the results are set in the network 903.

3. Steps 1 and 2 are repeated until the output V of the network 903 indicates a constant value.

4. A constant output V is used as a Jacobian of the robot arm.

Among the above described operation steps of the identifying device, the operation of the correlator is explained below in detail. As described above, a small input to a system to be controlled, for example, joint angle displacement vector $\Delta q$, and a small responsive output, for example, hand tip displacement vector $\Delta x$, are observed by an appropriate sensor.

The correlator 902 shown in FIG. 10 performs multiplication of vector elements. A T matrix setting unit for providing a coupling coefficient, that is, the T setting unit 904 shown in FIG. 10, calculates a concurrent correlation between joint angle displacements to obtain a Jacobian, and assigns the result as an element of the T matrix. When an inverse Jacobian is to be obtained, calculated is a concurrent correlation between hand tip displacements.

A unit for setting an input vector I for to the network 903, that is, the I setting unit 905 shown in FIG. 10, calculates through multiplication the concurrent correlation between the vector elements of a small input and a small output, that is, vector $\Delta q$ and vector $\Delta x$, and assigns the products as respective elements of the input vector I.

The correlation of vectors refers to a concurrent correlation at the same time, that is, at time n, between a small-input vector $\Delta q$ (n) and a small output vector $\Delta x$ (n). That is, it refers to multiplication at time n. Generally, the correlation between different time points n and m is referred to as a correlation function. The correlation function is defined in such a format as $<\Delta q_i(n) \cdot \Delta q_i(m)>$, where $<\ldots>$ refers to a given time average. In the present embodiment, the setting of the coefficient matrix T and the input vector I indicates the definition of the correlation. Now the equation of the above mentioned evaluation function E is developed. In this example, a Jacobian J is a quadratic square matrix, and its elements correspond to the elements of output vector $\vec{V}$ (hereinafter referred to as vector v) of the Hopfield neural network 903. That is, output vector V is calculated by the following equation.

$$\vec{V}(J_{11}, J_{12}, J_{21}, J_{22})^t \quad (14)$$

Thus, the operation performed by the T setting unit 904 for setting a coefficient matrix T is to obtain coupling coefficient $T_{ij}$ and use it as a weight coefficient of the network. For example, if $\Delta \vec{q}^t$ (hereinafter referred to as vector $\Delta q^t$)=($\Delta q_1$, $\Delta q_2$), then a coefficient matrix T can be calculated by the following equation.

$$T = -2 \begin{bmatrix} \Delta \vec{q}^t \cdot \Delta \vec{q} & 0 \\ 0 & \Delta \vec{q}^t \cdot \Delta \vec{q} \end{bmatrix} \quad (15)$$

Since vector $\Delta q$·vector $\Delta q^t$ is a quadratic square matrix, and likewise 0 indicates a quadratic 0 matrix, T is a biquadratic square matrix. Likewise, coefficient vector I can be defined as, for example, vector I=2 (vector $\Delta x$·vector $\Delta q^t$).

Among the operations of the above mentioned identifying device, explained below in detail is operation 3 in which processes 1 and 2 are repeatedly performed until a constant value is output from the network 903.

As described above, an input to each neuron forming part of the Hopfield neural network is obtained by the following equation.

$$\Sigma T_{ij} V_{j+I_i} \quad (16)$$

The obtained value indicates an internal potential (internal status) of a neuron. The value of the internal potential u at time n+1 can be obtained by the following equation.

$$u_k(n+1) = u_k(n) + C\left[\Sigma_i T_{ki} V_i(n) + I_k\right](C > 0) \quad (17)$$

That is, update amount $\Delta u$ (n) of the internal potential u at time n is obtained by the following equation.

$$\Delta u_k(n) = C\left[\Sigma_i T_{ki} V_i(n) + I_i\right](C > 0) \quad (18)$$

The obtained update amount is proportional to a sum of inputs. Based on the updated amount, the internal potential is updated, and output V=g (u) is obtained in an equilibrium state where the internal potential u is no longer changed. Therefore, the time taken for an output of the network 903 to be constant ends at the time when the update amount of the internal potential becomes 0.

As described above, the change in energy in the network 903 is obtained by the following equation.

$$E(V + \Delta V_k) - E(V) = -\left[\sum_i T_{ki} V_i + I_k\right]\Delta V_k - T_{kk}(\Delta V_k)^2 \quad (19)$$

-continued $$= -\Delta u_k \cdot \Delta V_k - T_{kk}(\Delta V_k)^2$$

If the correlation between the internal potential u and output V of a neuron is represented by the following equations, then a function g is a monotonically increasing function, and $\Delta u$ and $\Delta V$ change in the same direction, thereby reducing energy.

$$Vi=g(u_i)(g(u_i)=\tan h(u_i/\Delta)) \tag{20}$$

Since a coefficient matrix T and an input vector I are set each time they are generated according to the present invention, the energy of the network 903 is not necessarily reduced with time. However, at the moment of the update of the internal potential u, the u changes in the same direction as the decrease of. Since a coupling coefficient and a value of an input vector are constant in a common Hopfield neural network, the energy generally decreases with time.

Figure 11:
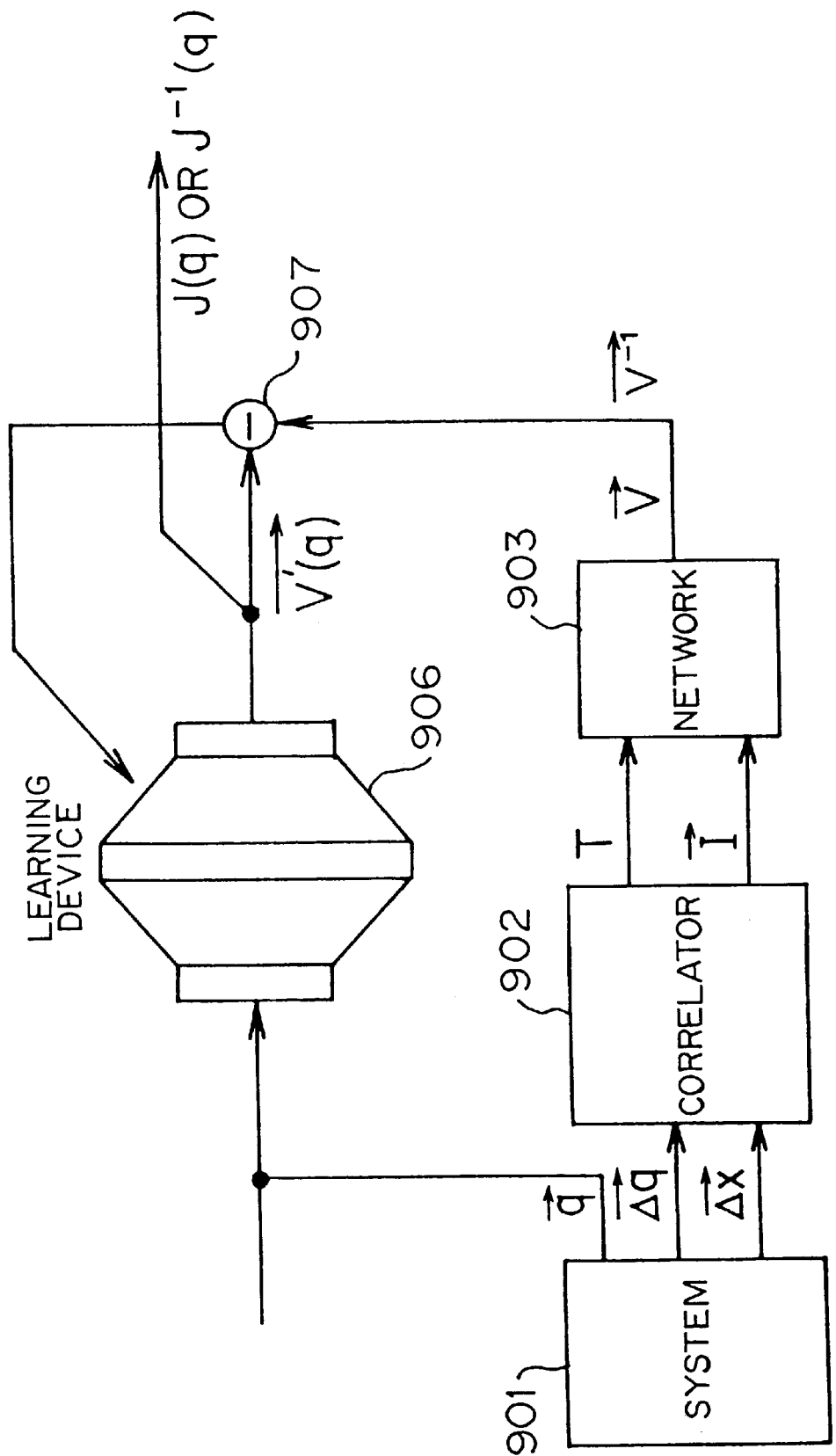
FIG. 11 is the block diagram of the configuration of the system identifying device capable of identifying a non-linear system.

Next, FIG. 11 shows the configuration of the device for identifying even a non-linear system.

The identifying device is a learning device 906 capable of learning a non-linear mapping (hierarchical neural network) provided in parallel with the device for identifying a linear system shown in FIG. 9. The identifying device shown in FIG. 9 cannot store data because coefficients applied to the network 903 are sequentially updated by the correlator 902, whereas the device shown in FIG. 11 comprises the above mentioned identifying device and the learning device 906, and therefore stores data.

What is stored in the device is amended by the identifying device when the system is replaced.

That is, the identifying device shown in FIG. 9 calculates a Jacobian using a specific status vector $q_0$. To extend the identification to a non-linear system, the dependency of a Jacobian on a status vector q should be taken into account. To achieve this, the neural network device 906 is equipped with learning capabilities. The learning of the neural network device 906 is carried out in the following procedure.

1. The learning device 906 receives an internal status vector q to generate a responsive output $\vec{V}'(q)$ (hereinafter referred to as vector V' (q)).

2. The status vector q is provided with a small displacement vector $\Delta q$ in the vicinity to measure a responsive hand tip displacement vector $\Delta x$. These values are applied to the correlator 902.

3. A coefficient matrix T of the identifying device and an input vector I are provided by the correlator 902.

4. Steps 2 and 3 are repeated until the output V of the network 903 converges.

5. Upon convergence, a learning device 906 starts learning vector V' (q) corresponding to the above mentioned status vector q. A teaching signal given in learning is an output of a subtracter 907.

6. Steps 1 through 5 are repeatedly performed with the status vector q changed.

Thus, the learning device 906 stores a set of the status vector q and the corresponding output vector V' (q). The above described vector V'(q) is a Jacobian J (q).

The identifying device shown in FIG. 11 enables an inverse Jacobian to be learned. In this case, the evaluation function E of the following equation (21) is used: $V_k = J^{-1}{}_{ij} (q_0)$.

$$E = (\Delta\vec{q} - \Delta\vec{q}')(\Delta\vec{q} - \Delta\vec{q}')^t \tag{21}$$

$$= (\vec{q} - V^{-1}(q_0)\Delta\vec{x})(\Delta\vec{q} - V^{-1}(q_0)\Delta\vec{x})^t$$

The matrix T of coupling coefficients in the Hopfield network 903 and the external input vector I for each neuron in the network can be calculated as follows by assigning the above equation to the equation of the network energy.

$$T = -2\begin{bmatrix} \Delta x_1^2 & \Delta x_1\Delta x_2 & 0 & 0 \\ \Delta x_2\Delta x_1 & \Delta x_2^2 & 0 & 0 \\ 0 & 0 & \Delta x_1^2 & \Delta x_1\Delta x_2 \\ 0 & 0 & \Delta x_2\Delta x_1 & \Delta x_2^2 \end{bmatrix} \tag{22}$$

$$I = 2(\Delta x_1\Delta q_1 \ \Delta x_2\Delta q_1 \ \Delta x_1\Delta q_2 \ \Delta x_2\Delta q_2)^t \tag{23}$$

The correlator 902 generates the above described matrix T of coupling coefficients and the external input vector I, and applied them to the Hopfield network 903. Thus, the Hopfield network 903 outputs an inverse Jacobian $J^{-1}$. Learning an inverse Jacobian is similar to the above described learning of a Jacobian except that the matrix T of coupling coefficients and an external input vector I are different from those used in learning a Jacobian. Therefore, omitted is the detailed explanation of the learning.

Figure 12:
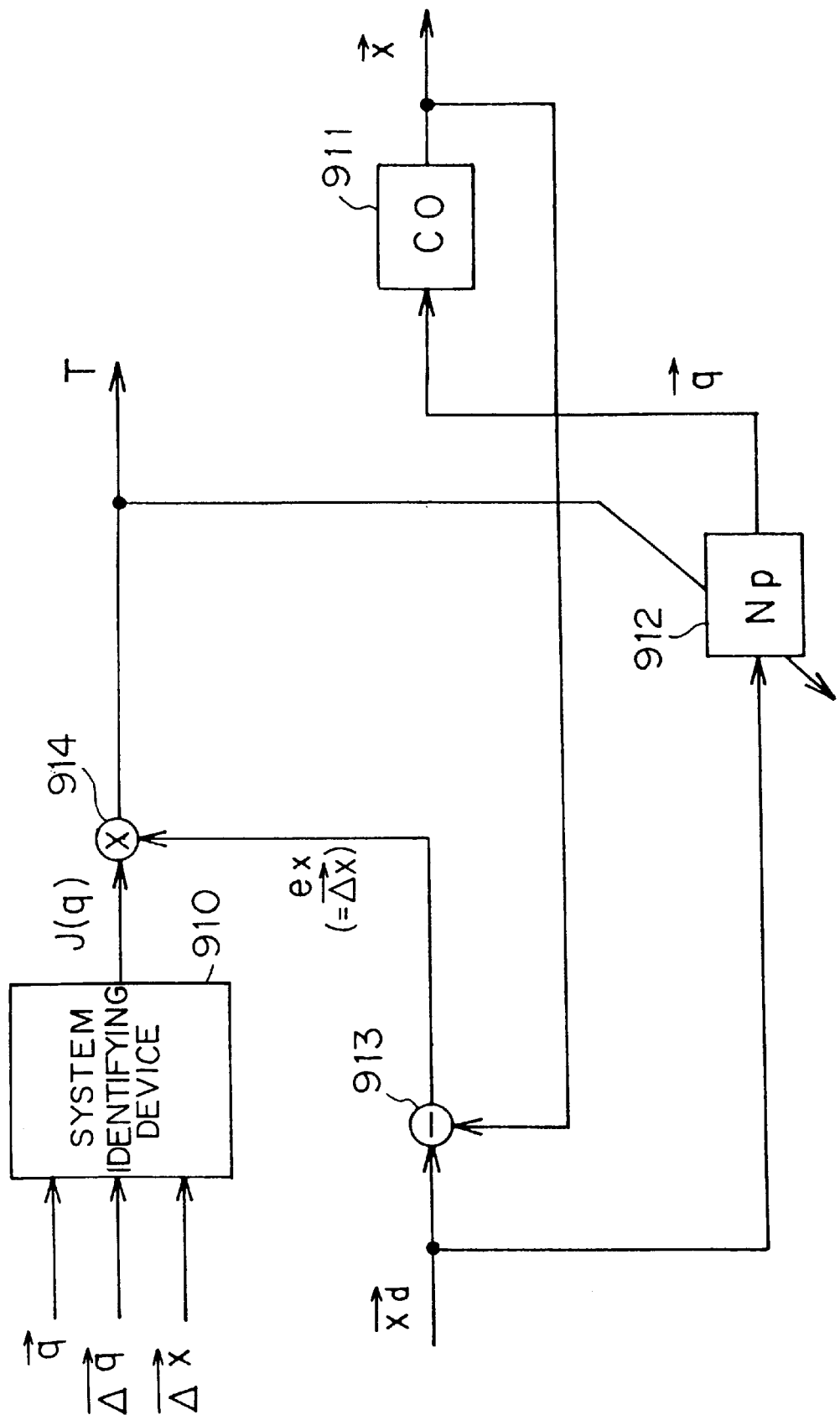
FIG. 12 is the block diagram of the configuration of the first adaptive learning control device operated with the identifying device shown in FIG. 11.

FIG. 12 is the block diagram showing the configuration of the first adaptive learning control device operated with the system identifying device shown in FIG. 11. In FIG. 12, the system identifying device comprises the correlator 902 shown in FIG. 11, the network 903, the learning device 906, and the subtracter 907. The device is indicated by a box 910. As a result of the system identification by the identifying device 910 in the present example, an output of a Jacobian is utilized by the adaptive learning control device.

The control device comprises a controlled object (CO) 911, a feed forward control mechanism 912 (for example, a neural network Np), a subtracter 913 for obtaining a difference between an externally input target value vector $x_d$ and an output vector x of the controlled object (Co) 911, that is, a control deviation $e_x$, and a multiplier 914 for multiplying an output of the identifying device 910 by the above described control deviation $e_x$ and providing the resultant product for the neural network Np 912 as a teaching signal.

In FIG. 12, the update amount T teaching signal of the weight of the neural network Np 912 corresponding to the feed forward control unit is obtained by the following equation.

$$T=\mu(\vec{x}_d\vec{x})J(q) \tag{24}$$

where the load $w_1$ is changed such that the evaluation function in equation (11) can be a minimum value. If the load $w_1$ is changed in a maximum reduction method, the update amount T of the load can be obtained as follows.

$$T = -\mu_1 \partial J/\partial w_1 = -\mu_1 \partial \vec{e}_x^2/\partial w_1 \tag{25}$$

$$= -\mu_1 \partial \vec{e}_x^t \cdot \partial \vec{e}_x/\partial w_1 = -\mu_1 \partial \vec{e}_x^t \cdot \partial F(\vec{q})/\partial \vec{q} \cdot$$

$$\partial \vec{q}/\partial w_1 = \mu(\vec{x}_d - \vec{x})J(q)$$

where $\mu$ is a positive constant. The detailed explanation of the variation of equation (25) is given later.

In equation (24), the symbol T is different from the coefficient matrix explained in FIG. 8.

Explained below is the learning method of the first adaptive learning control device shown in FIG. 12.

Control deviation vector $\Delta x$ (=$e_x$) is obtained as the difference between target value vector $x_d$ and output vector x. In the previous explanation, vector $\Delta x$ indicates a small displacement which is represented by the same symbol because the small displacement corresponds to an output of a control object. Likewise, vector $\Delta q$ is assigned its symbol.

The neural network Np 912 receives a product (T) of the multiplication of the Jacobian J (q) output from the system identifying device 910 by the control deviation vector $\Delta x$ as a teaching signal, and performs an online learning such that control operation amount vector q of the joint angle corresponding to target value vector q is output. Vector q is used when Jacobian J (q) is obtained, and is the same as vector q which is input to the controlled object (Co) 911.

When the learning proceeds, the network Np 912 acquires the data converting capabilities of converting vector $x_d$ to vector q as an inverse characteristic of the input/output characteristic of the controlled object 911. Even if a parameter of the controlled object (Co) 911 has been changed, the data converting capabilities of the network Np 912 is adaptively changed through the re-learning of the Hopfield network 903 and the learning device 906 which is an hierarchical network in the system identifying device 910.

Figure 13:
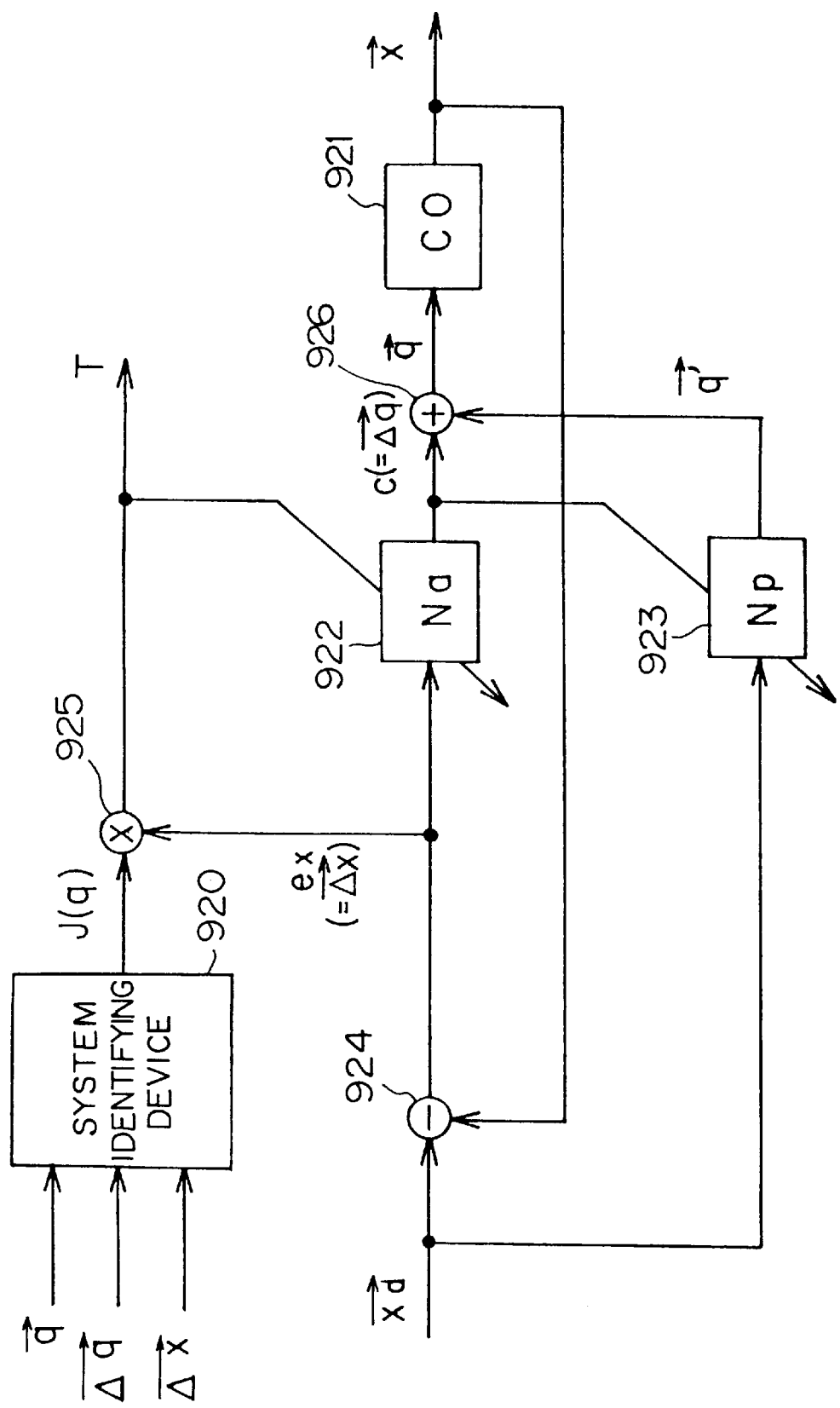
FIG. 13 is the block diagram of the configuration of the second adaptive learning control device operated with the identifying device shown in FIG. 11.

FIG. 13 is the block diagram showing the configuration of the second adaptive learning control device used with the system identifying device shown in FIG. 11. In FIG. 13, the system identifying device comprises the correlator 902, network 903, learning device 906, and subtracter 907 shown in FIG. 11, and is indicated by a box 920. The identifying device 920 outputs a system identification result, that is, an output of a Jacobian, to be used by the adaptive learning control device.

The control device comprises a controlled object (Co) 921, a feed forward control mechanism (for example, a neural network Np) 923, a substitute for the feedback control unit 502 shown in FIG. 5, for example, a hierarchical neural network Na 922, a subtracter 924 for obtaining the difference between externally input target value vector $x_d$ and output vector x of the control object (Co) 921, that is, control deviation $e_x$, a multiplier 925 for multiplying an output of the identifying device 920 by the above described control deviation $e_x$ and providing the resultant product for the neural network Na 922 as a teaching signal, and an adder 926 for adding the outputs of the two networks Na 922 and Np 923.

In FIG. 13, the update amount T of the weight of the hierarchical neural network Na 922 corresponding to the feedback control unit is calculated by equation (24) as in the first adaptive learning control device.

Described below is the learning method of the second adaptive control device shown in FIG. 13. The device comprises the hierarchical neural network Na 922, whereas the conventional device comprises a feedback control device having a fixed feedback gain. The network Na 922 performs learning based on an output of the identifying device 920 of the present invention using a teaching signal generated by the multiplier 925.

The network Na 922 receives control deviation vector $\Delta x$ (=target value vector $x_d$–output vector x) as an input, and performs learning such that a responsive difference amount vector $\Delta q$ of the control operation amount (joint angle) can be output. In the learning, the network Na 922 receives as a teaching signal a product (=T) obtained by multiplying Jacobian J (q) output by the system identifying device 920 by the above described control deviation vector $\Delta x$.

On the other hand, the network Np 923 forming a feed forward control mechanism uses deviation vector $\Delta q$ (=C) output by the network Na 922 as a teaching signal, and performs an online learning such that the deviation vector $\Delta q$ can be minimized. The controlled object (Co) 921 receives as a control operation amount a sum of the outputs of the two networks Na 922 and Np 923.

When the learning proceeds, the network Np 923 acquires the data converting capabilities of converting vector $x_d$ to vector q' as an inverse characteristic of the input/output characteristic of -the controlled object 921. The data converting capabilities always change adaptively responsive to an output of the system identifying device 920 and the data converting capabilities of the network Na 922. As compared with the first adaptive control device, the second adaptive control device can quickly respond to a change of a parameter of the controlled object (Co) 920 over its network Na 922.

Figure 14:
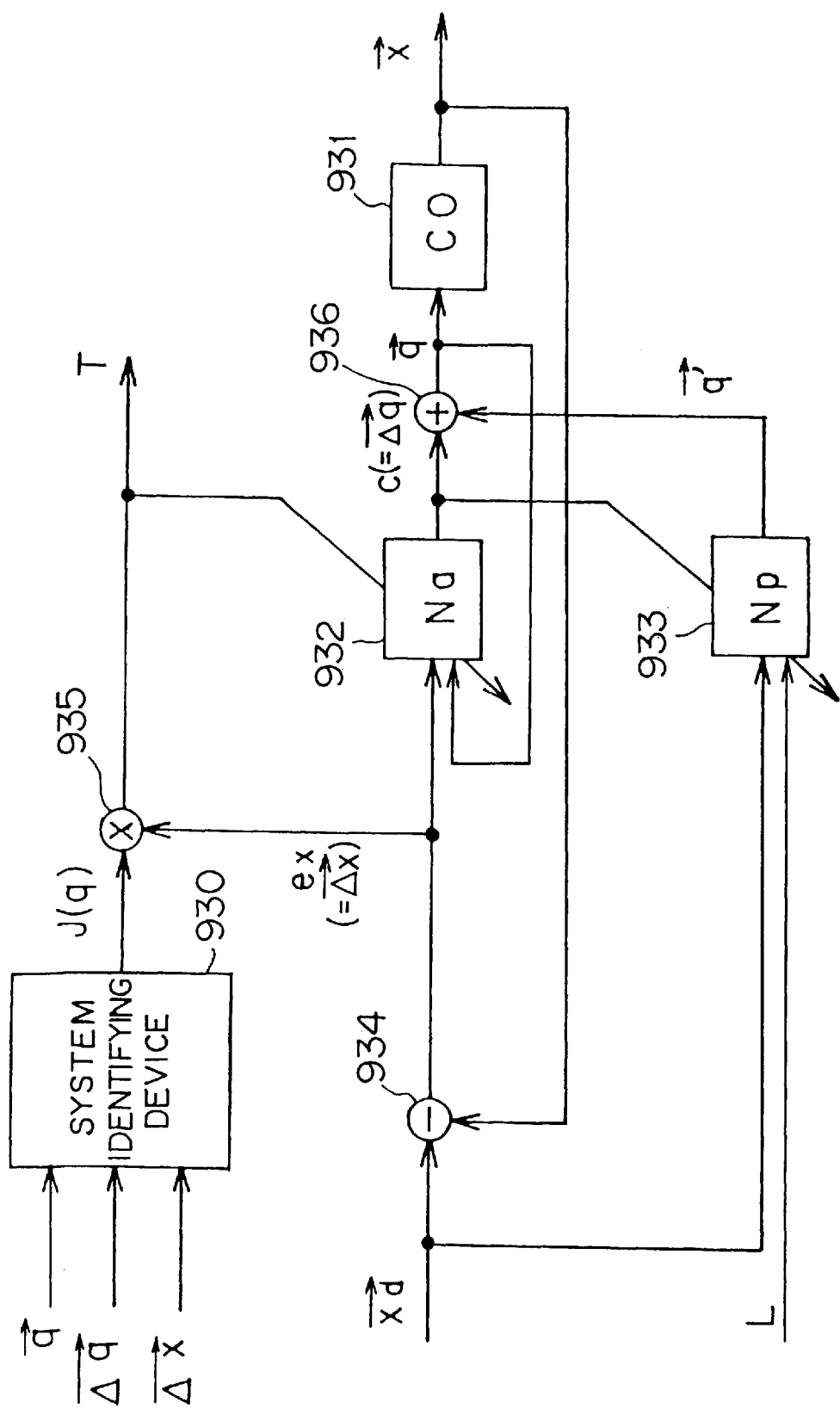
FIG. 14 is the block diagram of the configuration of the third adaptive learning control device operated with the identifying device shown in FIG. 11.

FIG. 14 is the block diagram showing the configuration of the fourth adaptive learning control device operated according to an identification result from the system identifying device shown in FIG. 11. In FIG. 14, the system identifying device comprises the correlator 902, network 903, learning device 906, and subtracter 907 shown in FIG. 11, and indicated by a box 930. The adaptive learning control device uses a system identification result generated by the identifying device 930, that is, an output result of an inverse Jacobian in this example.

The difference between the second adaptive learning control device and the third adaptive learning control device is that Na932 and Np933 of the third adaptive learning control device receive joint displacement vector q and link length L respectively.

Each of $\mu \vec{e}_x^t \cdot \partial F(\vec{q})/\partial \vec{q} \cdot \vec{q}/\partial w_1$ in equation (25) is described below.

(First Term) indicates an error of a hand tip position, and can be observed by a sensor, etc.

(Second Term) relates only to an input/output of the system, and is a Jacobian for state q of output x of the system. It is calculated as an approximation by the following equation.

$$(x(k)-x(k-1))/(q(k)-q(k-1)) \tag{26}$$

That is, the calculation is not performed using a Jacobian as an actual mathematics model, but by measuring changes in inputs and outputs of the system.

(Third Term) depends only on a neural network, and is a partial differential for the load $w_1$ of internal state q. It is obtained by an input to an output neuron. That is, if ø is a transition function of a neural network, then the output of a multilayer neural network can be calculated by the following equations.

$$c_i(k)=\Delta q_i(k)=\phi(\Sigma w_{ij}(k)V_j(k)-h_i) \tag{27}$$

$$u_i(k)=\Sigma w_{ij}(k)V_j(k)-h_i \tag{28}$$

If $q_{i0}$ is an initial value of a joint angle, then the n-th joint angle is calculated by the following equation.

$$q_i(n) = q_{i0} + \sum_{k=1}^{n} \Delta q_i(k) \tag{29}$$

-continued $$= q_{io} + \sum_{k=1}^{n} \phi(\sum w_{ij}(k)V_j(k) - h_i)$$

Thus, the partial differential in the third term is calculated as follows.

$$\partial q_i/\partial w_{ij} = \phi'(u_i)V_j \quad (30)$$

where $\phi'(u_i)$ represents the differential of a transition function.

If a transition function is linear, the term is a constant (1) and the third term exists only for $V_j$. Since $V_j$ is an output of the second layer (precedent of the output layer), it depends simply on the representation of the input in the second layer (that is, the output of a neuron in the second layer in a table-form neural network). Since the value equals 1 or 0, and relates to a learning only when it is 1.

Thus, Na932 operates for $x \rightarrow x_d$ by updating a load (learning). As a result, an image of $\Delta x \rightarrow \Delta q$ corresponding to joint displacement vector q, that is, an inverse Jacobian, is obtained in Na932 after a learning in an on-line operation.

Furthermore, Np933 receives a target hand-tip position $x_d$. In addition, an input of link length L enables an output responsive to a change to be quickly generated even when a link length has changed (if it is a learned link length). If an output of Np933 is q' in FIG. 14, the learning of Np933 is performed with the internal state p of the system used as a teacher. With an evaluation function $J_2=(q-q')^2/2$, the update amount can be obtained as follows.

$$\Delta w_2 = \mu_2(q - q')\partial q'/\partial w_2 = \mu_2(q - q')V_2 \quad (31)$$

$$= \mu_2 \Delta q V_2$$

As a result, inverse conversion $x_d \rightarrow q$ of an input/output of a controlled system is formed in Np933. A learning method based on equation (31) using $J_2$ as an evaluation function can be interpreted as follows.

Since $q = \Delta q + q'$, minimizing $J_2$ equals minimizing $\Delta q$ with q set as a virtual object value. That is, the learning of Np933 can be referred to as a learning system of minimizing $\Delta q$, that is, an output of Na932.

The circuit shown in FIG. 14 comprises Na932 for operating adaptively using information mainly from sensors such as visual and other senses (a joint angle), etc. and an additional Np933 for learning based on the operation of Na932 and obtaining from Na932 an appropriate operation of a controlled system assigned a target. Np933 functions as a feed-forward adaptive control unit capable of performing a learning operation.

Unless link length L is applied to Np933 as an input, Np933 cannot generate a correct output until an amendment is made by Np933. end of addition.

Figure 15:
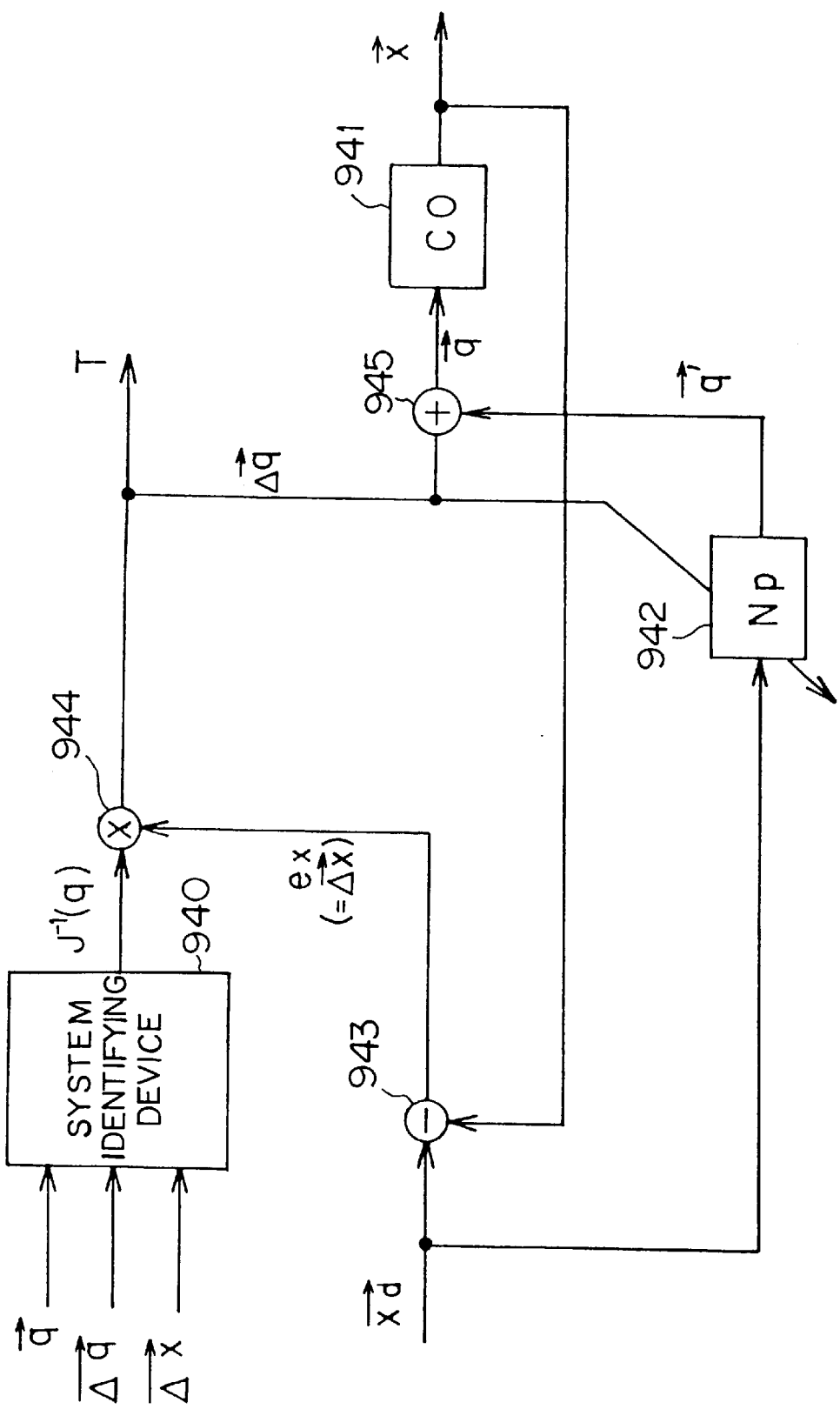
FIG. 15 is the block diagram showing the configuration of the fourth adaptive learning control device operated with the identifying device show in FIG. 11.

FIG. 15 is the block diagram showing the configuration of the fourth adaptive learning control device operated according to an identification result from the system identifying device shown in FIG. 11. In FIG. 15, the system identifying device comprises the correlator 902, network 903, learning device 906, and subtracter 907 shown in FIG. 11, and indicated by a box 940. The adaptive learning control device uses a system identification result generated by the identifying device, that is, an output result of an inverse Jacobian in this example.

The control device comprises a controlled object (Co) 941, a feed forward control mechanism (for example, a neural network Np) 942, a subtracter 943 for obtaining a difference between target value vector $x_d$ and output vector x of the controlled object 941, that is, control deviation $e_x$, a multiplier 944 for multiplying an output of the identifying device 940 by control deviation $e_x$ and providing the resultant product to the neural network Np 942 as a teaching signal, and an adder 945 for adding the product from the multiplier 944 and an output from the network Np 942.

The neural network Np 942 performs learning such that a teaching signal C generated in accordance with an output of the system identifying device 940 can be minimized. The teaching signal C is calculated by the following equation.

$$C = \Delta x J^{-1}(q) = (x_d - x)J^{-1}(q) \quad (32)$$

When the learning proceeds, the network Np 943 acquires the data converting capabilities of converting vector $x_d$ to vector q' as an inverse characteristic of the input/output characteristic of the controlled object 941. As compared with the second adaptive learning control device, the present device can directly obtain deviation vector $\Delta q$ and therefore realizes a more adaptive operation by applying control operation amount vector q of a joint angle obtained by adding the deviation vector $\Delta q$ and output q' of the network Np 942.

Figure 16:
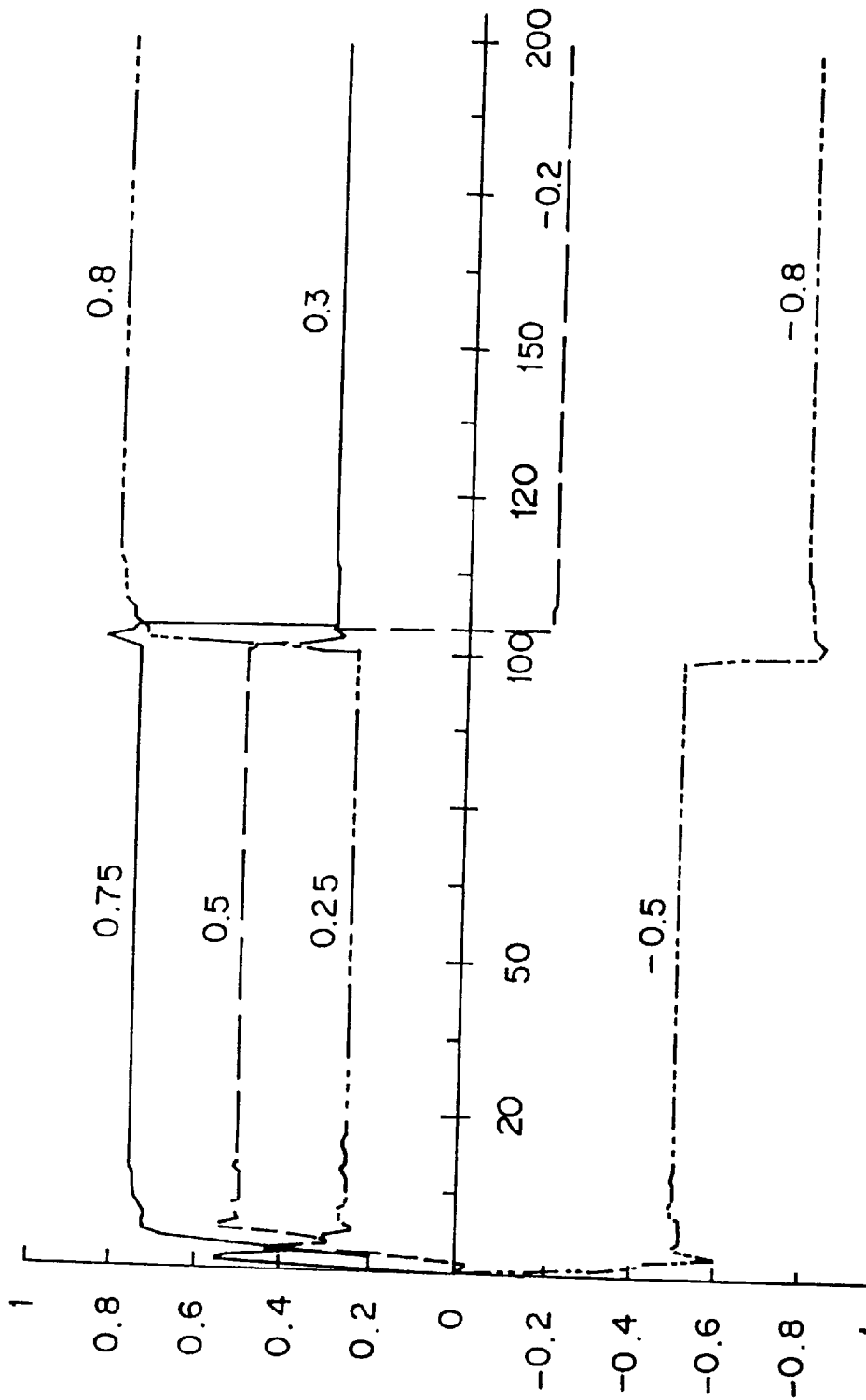
FIG. 16 shows the simulation of an identification result of a Jacobian according to the present embodiment.

FIG. 16 shows the identification result of a Jacobian processed by the robot manipulator having two links. Actually, the simulation result of a Jacobian J is shown in FIG. 16 with the length of each of the two links set as 0.5 m. The value of a Jacobian set as equation (33) for repetition of 1 through 100, and as equation (34) for repetition of 101 through 200.

$$J = (0.5\ 0.75\ 0.25\ -0.5)^t \quad (33)$$

$$J = (-0.2\ 0.3\ 0.8\ -0.8)^t \quad (34)$$

FIG. 16 shows that the value of the Jacobian converges on a correct value by repeating the process approximately 20 times.

Figure 17:
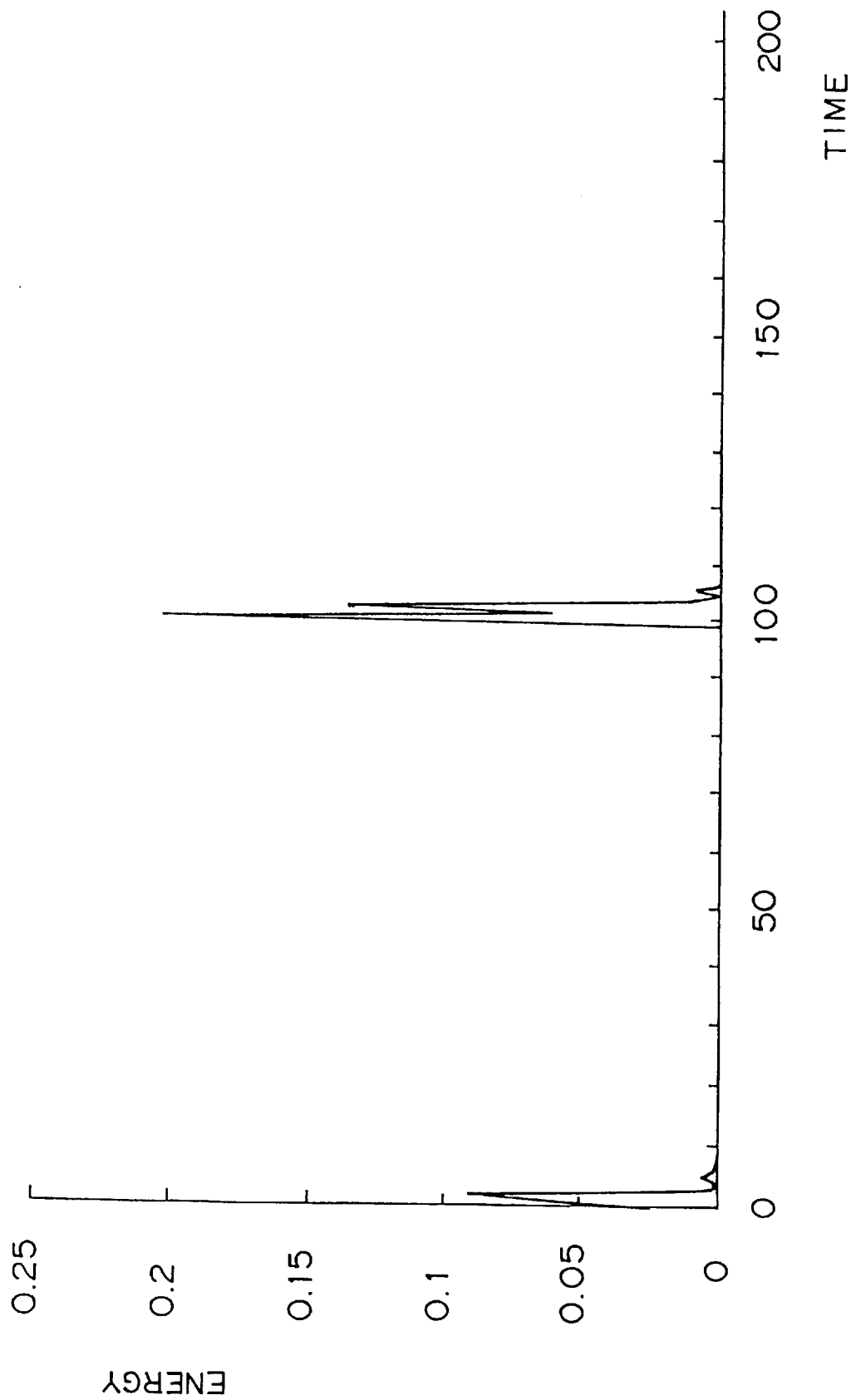
FIG. 17 shows the changes in energy in the simulation shown in FIG. 16.

FIG. 17 shows the variations of the energy of the network 903 when the simulation shown in FIG. 16 is carried out. In the processes of equations (12) and (13), the term of (vector $\Delta x)^2$ is ignored when equation (11) is developed. However, the energy of the term is exactly counted in FIG. 16. The amount of energy decreases with time in the Hopfield network as described above because the term of (vector $\Delta x)^2$ becomes a constant.

In FIG. 17, the energy converges within a shorter time of about 5 unit time than in FIG. 16. It shows a temporary increase around 100 unit time when the value of a Jacobian changes, but converges again on 0 within a short time as it initially does.

When a value of an inverse Jacobian is obtained as an identification result, it likewise converges on a correct value as in the case of obtaining a value of a Jacobian. The detailed explanation is omitted here.

As explained above, an identification result of an object system can be obtained over a neural network according to the present invention, and an identifying device can be operated as hardware. Furthermore, the identifying device also works on a non-linear system by additionally using a hierarchical neural network.

An online learning of an adaptive control device is also realized if the identifying device of the present invention is used to obtain a teaching signal in the adaptive control device. In this case, re-learning is not required even if characteristics of a control object change. Thus, the utilization can be enhanced much more than the conventional offline learning methods.

Furthermore, as described above, the present invention can work on a non-linear system in combined use with a hierarchical neural network.

What is claimed is:

1. A system identifying device for outputting an operation parameter identification result on a control object system, comprising:

data output means for changing set value data to change settings of data processing capabilities based on an input/output correlation of a small input to and a small output response from the control object system; and a Hopfield neural network, having a plurality of neurons connected to one another, to calculate and output an identification result using the set value data.

2. The system identifying device according to claim 1, wherein said operation parameter is a Jacobian calculated from the small input and the small output response.

3. The system identifying device according to claim 1, wherein said data output means for changing set value data is a correlator for calculating data used when said recurrent neural network calculates the identification result based on the input/output correlation of said control object system.

4. The system identifying device according to claim 1, wherein a noise is used as the small input.

5. The system identifying device according to claim 1, wherein said control object system is a multi-joint robot;

said input/output correlation of the control object system refers to a correlation between a small displacement of a joint angle of the multi-joint robot and a small displacement of a hand tip position of the robot; and said recurrent neural network outputs as the identification result a Jacobian of a matrix with which the small displacement of the joint angle of the multi-joint robot is converted into the small displacement of the hand tip position.

6. The system identifying device according to claim 1, wherein said control object system is a multi-joint robot;

said input/output correlation of the control object system refers to a correlation between a small displacement of a joint angle of the multi-joint robot and a small displacement of a hand tip position of the robot; and said recurrent neural network outputs as the identification result an inverse Jacobian of a matrix with which the small displacement of the hand tip position of the multi-joint robot is converted into the small displacement of the joint angle.

7. A system identifying device for outputting an operation Parameter identification result on a control object system, comprising:

a Hopfield neural network, having a plurality of neurons connected to one another, to calculate and output an identification result using set value data; and data output means for providing said Hopfield neural network with the set value data, including an external input signal to each of the neurons and a coupling coefficient bets the neurons, the set value data gradually changed on a correspondence between a small input to the control system and a small output response from the control object system until an output of said Hopfield neural network indicates a constant value, said Hopfield neural network outputting the constant value as the operation parameter identification result.

8. The system identifying device according to claim 7, wherein said input/output correlation of the control object system refers to a correlation between a small displacement response of a given input value and a small displacement response of an output of the control object system; and while gradually changing the given input value, said data output means changes an external input signal to each of the neurons, which forms part of the neural network, and coupling a coefficient between the neurons so that an internal potential of each of the neurons is updated and the output of the neural network is changed.

9. A system identifying device for outputting an operation parameter identification result on a control object system, comprising:

data output means for changing set value data to change settings of data processing capabilities based on input/output correlation of the control object system, the input/output correlation refering to a correspondence between a small input to the control object system and a small output response from the control object system;

a first neural network to calculate and output the identification result using the set value data; and a second neural network to receive an input signal to the control object system, to perform a learning session such that an output of said second neural network matches an output of said first neural network, and to store as a learning result of the operation parameter identification result of the control object system.

10. The system identifying device according to claim 9, wherein said second neural network stores the learning result of the operation parameter identifying result regarding a non-linear control object system.

11. An adaptive learning control device, for identifying a control object system having a feed forward control mechanism, said device comprising:

data output means for changing set value data to change settings of data processing capabilities based on an input/output correlation of a small input to and a small output response from the control object system, a Hopfield neural network, having a plurality of neurons connected to one another, to calculate and output an identification result using the set value data output by said data output means; and multiplier means for providing the feed forward control mechanism with a multiplication result obtained by multiplying a control deviation between a target value of the control object system and an actual output value by an output of said recurrent neural network.

12. The adaptive learning control device according to claim 11, wherein the feed forward control mechanism is a neural network, which receives an output of said multiplier means as a teaching signal, and performs an online learning such that an output of said feed forward control mechanism converges on an optimum value.

13. The adaptive learning control device according to claim 11, wherein said recurrent neural network outputs a Jacobian calculated with a small input to the control object system and a small output response from said control object system.

14. An adaptive learning control device for identifying a control object system having a feed forward control mechanism and a feedback control mechanism including a feedback control neural network, the feedback control mechanism adding a feedback signal, based on a control deviation between a target value of the control object system and an actual output of the control object system, to an output of the feed forward control mechanism to obtain a resultant sum output to the control object system, said adaptive learning control device comprising:

data output means for changing set value data to change settings of data processing capabilities based on an input/output correlation of a small input to and a small output response from the control object system;

a Hopfield neural network, having a plurality of neurons connected to one another, to calculate and output an identification result using the set value data output by said data output means; and multiplier means for multiplying an output of said recurrent neural network by the control deviation and providing a resultant product to the feedback control neural network as a teaching signal.

15. The adaptive learning control device according to claim 14, wherein the feed forward control mechanism changes the actual output of the control object system so that the control deviation can be gradually reduced through learning by the feedback control neural network in response to the resultant product output by said multiplier means.

16. The adaptive learning control device according to claim 15, wherein the feed forward control mechanism is a neural network, receives the feedback signal from the feedback control mechanism as a teaching signal, and learns to have the output of the feed forward control mechanism converge on an optimum value.

17. The adaptive learning control device according to claim 16, wherein said feedback control mechanism receives an addition result which is input to the control object system.

18. The adaptive learning control device according to claim 17, wherein the control object system is a multijoint robot;

wherein the input/output correlation of the control object system refers to a correlation between a small displacement of a joint angle of the multi-joint robot and a small displacement of a hand tip position of the robot; and wherein the feed-forward control mechanism receives a link length of said robot.

19. The adaptive learning control device according to claim 14, wherein said recurrent neural network outputs a Jacobian calculated with a small input to the control object system and a small output response from said control object system.

20. An adaptive learning control device, provided with a feed forward control mechanism for a control object system, for identifying said control object system, said device comprising:

data output means for changing set value data to change settings of data processing capabilities based on an input/output correlation of a small input to and a small output response from the control object system;

a Hopfield neural network, having a plurality of neurons connected to one another, to calculate and output an identification result using the set value data output by said data output means;

multiplier means for providing said feed forward control mechanism a multiplication result obtained by multiplying a control deviation between a target value of the control object system and an actual output value by an output of said recurrent neural network; and adding means for adding an output of said feed forward control mechanism and an output of said multiplier means and providing for the control object system a resultant sum as a control operation amount.

21. The adaptive learning control device according to claim 20, wherein the feed-forward control mechanism is a control neural network; and wherein the multiplication result is provided as a teaching signal for said control neural network.

22. The adaptive learning control device according to claim 20, wherein said recurrent neural network outputs a Jacobian calculated with a small input to the control object system and a small output response from the control object system.

23. A system identifying device for outputting an operation parameter identification result of a control object system, comprising:

a Hopfield neural network with a plurality of neurons connected together to calculate and output the identification result using value data;

data output means for providing said Hopfield neural network with the set value data, including an external input signal to each of the neurons and a coupling coefficient between the neurons, the set value data being gradually changed until an output of said Hopfield neural network indicates a constant value as the identification result.

* * * * *

UNITED STATES PATENT AND TRADEMARK OFFICE
CERTIFICATE OF CORRECTION

PATENT NO.: 6,000,827
DATED : December 14, 1999
INVENTOR(S): Shinya HOSOGI

It is certified that error appears in the above-identified patent and that said Letters Patent is hereby corrected as shown below:

IN THE CLAIMS:

Column 17, line 51, change "Parameter" to --parameter--;

line 59, change "bets" to --between--;

line 60, after "changed" insert --based--; and line 61, after "control" insert --object--.

Signed and Sealed this

Fifteenth Day of August, 2000

Attest:

Q. TODD DICKINSON

Attesting Officer         Director of Patents and Trademarks